(12) United States Patent
Ohshima et al.

(10) Patent No.: US 9,875,381 B2
(45) Date of Patent: Jan. 23, 2018

(54) COMMUNICATION METHOD AND COMMUNICATION SYSTEM

(71) Applicant: Semiconductor Energy Laboratory Co., Ltd., Kanagawa-ken (JP)

(72) Inventors: Kazuaki Ohshima, Kanagawa (JP); Hidetomo Kobayashi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 15/342,520

(22) Filed: Nov. 3, 2016

(65) Prior Publication Data

US 2017/0061173 A1    Mar. 2, 2017

Related U.S. Application Data

(63) Continuation of application No. 13/488,873, filed on Jun. 5, 2012, now Pat. No. 9,489,830.

(30) Foreign Application Priority Data

Jun. 8, 2011 (JP) ................................ 2011-127823

(51) Int. Cl.
*G08C 17/00* (2006.01)
*G08C 19/28* (2006.01)
(Continued)

(52) U.S. Cl.
CPC ..... *G06K 7/10158* (2013.01); *G06K 7/10366* (2013.01); *G08C 17/00* (2013.01)

(58) Field of Classification Search
CPC ....................................................... G11C 5/06
See application file for complete search history.

(56) References Cited

U.S. PATENT DOCUMENTS 5,731,856 A    3/1998 Kim et al.
5,744,864 A    4/1998 Cillessen et al.
(Continued)

FOREIGN PATENT DOCUMENTS

EP    0952525 A    10/1999
EP    1737044 A    12/2006
(Continued)

OTHER PUBLICATIONS

Kamiya.T et al., "Carrier transport properties and electronic structures of amorphous oxide semiconductors: the present status", Solid State Physics, Sep. 1, 2009, vol. 44, No. 9, pp. 621-633, Agne Gijutsu Center.

(Continued)

*Primary Examiner* — Joseph Feild
*Assistant Examiner* — Pameshanand Mahase
(74) *Attorney, Agent, or Firm* — Husch Blackwell LLP

(57) ABSTRACT

A command sequence is restarted from the middle even when supply of power supply voltage to an internal circuit in a wireless tag is temporarily stopped (a power flicker occurs). A register or a cache memory included in a signal processing circuit in the wireless tag continues to retain data even after the supply of power supply voltage is stopped. After the power flicker occurs, the signal processing circuit in the wireless tag is returned to the state before the supply of power supply voltage is stopped and can restart signal processing. Consequently, the command sequence can be restarted from the middle.

30 Claims, 19 Drawing Sheets

(51) Int. Cl.
*G08C 19/22* (2006.01)
*G11C 5/06* (2006.01)
*G11C 15/04* (2006.01)
*G06K 7/10* (2006.01)

(56) References Cited

U.S. PATENT DOCUMENTS

| | | |
|---|---|---|
| 6,294,274 B1 | 9/2001 | Kawazoe et al. |
| 6,523,754 B2 | 2/2003 | Hoshino et al. |
| 6,563,174 B2 | 5/2003 | Kawasaki et al. |
| 6,631,479 B1 | 10/2003 | Nishimura |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,675,796 B2 | 3/2010 | Kurokawa |
| 7,719,001 B2 | 5/2010 | Nomura et al. |
| 7,732,819 B2 | 6/2010 | Akimoto et al. |
| 8,134,156 B2 | 3/2012 | Akimoto |
| 8,188,461 B2 | 5/2012 | Sato et al. |
| 8,421,068 B2 | 4/2013 | Yamazaki et al. |
| 2001/0045468 A1 | 11/2001 | Ikefuji et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2005/0280511 A1 | 12/2005 | Yokoyama et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0169349 A1 | 7/2008 | Suzuki et al. |
| 2008/0182358 A1 | 7/2008 | Cowdery-Corvan et al. |
| 2008/0197978 A1 | 8/2008 | Diorio et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0034387 A1 | 2/2010 | Takemura |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0149851 A1 | 6/2010 | Asami et al. |
| 2010/0171117 A1 | 7/2010 | Kuwabara et al. |
| 2010/0200663 A1 | 8/2010 | Dozen et al. |
| 2010/0205519 A1 | 8/2010 | Ito et al. |
| 2010/0253478 A1 | 10/2010 | Koyama et al. |
| 2011/0089414 A1 | 4/2011 | Yamazaki et al. |
| 2011/0101331 A1 | 5/2011 | Yamazaki et al. |
| 2011/0101351 A1 | 5/2011 | Yamazaki |
| 2011/0121887 A1 | 5/2011 | Kato et al. |
| 2011/0121911 A1 | 5/2011 | Kamata |
| 2011/0187435 A1 | 8/2011 | Kamata |
| 2011/0187688 A1 | 8/2011 | Yamazaki et al. |
| 2011/0215787 A1 | 9/2011 | Shionoiri et al. |
| 2011/0216566 A1 | 9/2011 | Kamata |
| 2011/0249502 A1 | 10/2011 | Saito |
| 2012/0024963 A1 | 2/2012 | Shionoiri et al. |
| 2012/0032785 A1 | 2/2012 | Kamata |
| 2012/0113707 A1* | 5/2012 | Takemura ............ G11C 11/404 365/149 |
| 2012/0230078 A1* | 9/2012 | Fujita .................... G11C 14/00 365/65 |
| 2012/0269013 A1* | 10/2012 | Matsuzaki ......... H01L 27/1225 365/191 |
| 2012/0274378 A1 | 11/2012 | Fujita |
| 2013/0193434 A1 | 8/2013 | Yamazaki et al. |

FOREIGN PATENT DOCUMENTS

| | | |
|---|---|---|
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-110392 A | 4/1993 |
| JP | 05-251705 A | 9/1993 |
| JP | 08-264794 A | 10/1996 |
| JP | 10-187549 A | 7/1998 |
| JP | 11-505377 | 5/1999 |

(56) References Cited

FOREIGN PATENT DOCUMENTS

| | | |
|---|---|---|
| JP | 2000-044236 A | 2/2000 |
| JP | 2000-150900 A | 5/2000 |
| JP | 2000-293388 A | 10/2000 |
| JP | 2002-076356 A | 3/2002 |
| JP | 2002-123806 A | 4/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-201437 A | 8/2007 |
| JP | 2010-040815 A | 2/2010 |
| JP | 2010-041405 A | 2/2010 |
| JP | 2010-135778 A | 6/2010 |
| JP | 2010-198396 A | 9/2010 |
| JP | 2011-103458 A | 5/2011 |
| JP | 2011-109032 A | 6/2011 |
| WO | WO-2004/114391 | 12/2004 |
| WO | WO-2007/030863 | 3/2007 |
| WO | WO-2011/046048 | 4/2011 |

OTHER PUBLICATIONS

Ozaki.H et al., "Wireless operations for 13.56-MHz band RFID tag using amorphous oxide TFTs", IEICE Electronics Express, Feb. 25, 2011, vol. 8, No. 4, pp. 225-231.

Yin.H et al., "Bootstrapped Ring Oscillator with Propagation Delay Time below 1.0 nsec/stage by Standard 0.5μm Botton-Gate Amorphous Ga2O3—In2O3—ZnO TFT Technology", IEDM 08: Technical Digest of International Electron Devices Meeting, 2008, pp. 1-4.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Ikeda.T et al., "Full-Functional System Liquid Crystal Display Using CG-Silicon Technology", SID Digest '04: SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor", IDW '08: Proceedings of the 15th International Display Workshops, Dec. 3, 2008, pp. 1637-1640.

Hayashi.R et al., "42.1: Invited Paper: Improved Amorphous In—Ga—Zn—O TFTS", SID Digest '08: SID International Symposium Digest of Technical Papers, May 20, 2008, vol. 39, pp. 621-624.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Nakamura.M et al., "The phase relations in the In2O3—Ga2ZnO4—ZnO system at 1350° C", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m = 3, 4, and 5), InGaO3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Asakuma.N. et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Osada.T et al., "15.2: Development of Driver-Integrated Panel using Amorphous In—Ga—Zn—Oxide TFT", SID Digest '09: SID International Symposium Digest of Technical Papers, May 31, 2009, vol. 40, pp. 184-187.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08: SID International Symposium Digest of Technical Papers, May 20, 2008, vol. 39, pp. 633-636.

Lee.J et al., "World'S Largest (15-Inch) XGA AMLCD Panel Using IGZO Oxide TFT", SID Digest '08: SID International Symposium Digest of Technical Papers, May 20, 2008, vol. 39, pp. 625-628.

Nowatari.H et al., "60.2: Intermediate Connector With Suppressed Voltage Loss for White Tandem OLEDs", SID Digest '09: SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Tsuda.K et al., "Ultra Low Power Consumption Technologies for Mobile TFT-LCDs ", IDW '02: Proceedings of the 9th International Display Workshops, Dec. 4, 2002, pp. 295-298.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array", SID Digest '08: SID International Symposium Digest of Technical Papers, May 20, 2008, vol. 39, No. 1, pp. 1-4.

Park.J et al., "High performance amorphous oxide thin film transistors with self-aligned top-gate structure", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems", Journal of Solid-State Circuits, 2008, vol. 43, No. 1, pp. 292-299.

Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition: "The Blue Phase"", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane", SID Digest '09: SID International Symposium Digest of Technical Papers, May 31, 2009, pp. 280-283.

Lee.M et al., "15.4:Excellent Performance of Indium-Oxide-Based Thin-Film Transistors by DC Sputtering", SID Digest '09: SID International Symposium Digest of Technical Papers, May 31, 2009, pp. 191-193.

(56) References Cited

OTHER PUBLICATIONS

Jin.D et al., "65.2:Distinguished Paper:World-Largest (6.5") Flexible Full Color Top Emission AMOLED Display on Plastic Film and its Bending Properties", SID Digest '09: SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs", IDW '09: Proceedings of the 16th International Display Workshops, 2009, pp. 689-692.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.S et al., "Challenge to Future Displays: Transparent AM-OLED Driven by Peald Grown ZnO TFT", IMID '07 Digest, 2007, pp. 1249-1252.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17- 22.

Hosono.H, "68.3:Invited Paper:Transparent Amorphous Oxide Semiconductors for High Performance TFT", SID Digest '07: SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT", SID Digest '09: SID International Symposium Digest of Technical Papers, May 31, 2009, pp. 1110-1112.

Ohara.H et al., "21.3:4.0 In. QVGA AMOLED Display Using In—Ga—Zn—Oxide TFTs With a Novel Passivation Layer", SID Digest '09: SID International Symposium Digest of Technical Papers, May 31, 2009, pp. 284-287.

Miyasaka.M, "SUFTLA Flexible Microelectronics on Their Way to Business", SID Digest '07: SID International Symposium Digest of Technical Papers, 2007, vol. 38, pp. 1673-1676.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications", SID Digest '09: SID International Symposium Digest of Technical Papers, May 31, 2009, pp. 578-581.

Asaoka.Y et al., "29.1:Polarizer-Free Reflective LCD Combined With Ultra Low-Power Driving Technology", SID Digest '09: SID International Symposium Digest of Technical Papers, May 31, 2009, pp. 395-398.

Lee.H et al., "Current Status of, Challenges to, and Perspective View of AM-OLED", IDW '06: Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application", SID Digest '07: SID International Symposium Digest of Technical Papers, 2007, vol. 38, pp. 1737-1740.

Nakamura.M, "Synthesis of Homologous Compound with New Long-Period Structure", NIRIM Newsletter, Mar. 1, 1995, vol. 150, pp. 1-4.

Kikuchi.H et al., "Polymer-Stabilized Liquid Crystal Blue Phases", Nature Materials, Sep. 2, 2002, vol. 1, pp. 64-68.

Kimizuka.N. et al., "Spinel, YBFE2O4, and YB2FE3O7 Types of Structures for Compounds in the In2O3 and Sc2O3—A2O3—BO Systems [A; Fe, Ga, or Al; B: Mg, Mn, Fe, Ni, Cu, or Zn] at Temperatures Over 1000° C", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display", SID Sigest '08: SID International Symposium Digest of Technical Papers, May 20, 2008, vol. 39, pp. 629-632.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Janotti.A et al., "Native Point Defects In ZnO", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States", SID Digest '08: SID International Symposium Digest of Technical Papers, May 20, 2008, vol. 39, pp. 1277-1280.

Janotti.A et al., "Oxygen Vacancies in ZnO", Appl. Phys. Lett. (Applied Physics Letters), 2005, vol. 87, pp. 122102-1-122102-3.

Oba.F et al., "Defect energetics in ZnO: A hybrid Hartree-Fock density functional study", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor", Philosophical Magazine, 2001, vol. 81, No. 5, pp. 501-515.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays", IDW '08: Proceedings of the 6th International Display Workshops, Dec. 3, 2008, pp. 581-584.

Kim.S et al., "High-Performance oxide thin film transistors passivated by various gas plasmas", 214th ECS Meeting, 2008, No. 2317, ECS.

Clark.S et al., "First Principles Methods Using CASTEP", Zeitschrift fur Kristallographie, 2005, vol. 220, pp. 567-570.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

\* cited by examiner

● In
○ Sn
○ Zn
● O

● In
○ Ga
○ Zn
● O

COMMUNICATION METHOD AND COMMUNICATION SYSTEM

This application is a continuation of copending U.S. application Ser. No. 13/488,873, filed on Jun. 5, 2012 which is incorporated herein by reference.

BACKGROUND OF THE INVENTION

1. Field of the Invention

The present invention relates to communication methods and communication systems each using wireless tags and reader/writers.

2. Description of the Related Art

Communication systems that include wireless tags (also referred to as ID tags, ID cards, IC cards, IC tags, IC chips, radio frequency identification (RFID) tags, RF tags, wireless chips, or electronic tags) and reader/writers, and perform non-contact communication between the wireless tags and the reader/writers are widely used. Such a communication system performs communication by performing more than once a step of transmitting a response from a wireless tag to a reader/writer after the reader/writer transmits a command to the wireless tag and the wireless tag receives the command (for example, see FIG. 2 and the description of FIG. 2 in Patent Document 1). Repetition of this step is hereinafter also referred to as a command sequence.

Further, wireless tags that generate power supply voltage used for operating internal circuits with the use of electromagnetic waves from reader/writers (hereinafter also referred to as passive wireless tags) are widely used as wireless tags. Passive wireless tags themselves do not need to have power sources such as batteries, and can be made small.

REFERENCE

Patent Document 1: Japanese Published Patent Application No. 2010-041405.

SUMMARY OF THE INVENTION

Depending on the position of a wireless tag (an antenna in the wireless tag) relative to the position of a reader/writer, the wireless tag cannot receive an electromagnetic wave from the reader/writer sufficiently in some cases. In the case where the wireless tag cannot receive an electromagnetic wave from the reader/writer sufficiently, a passive wireless tag cannot generate power supply voltage used for operating an internal circuit. Thus, supply of power supply voltage to the internal circuit in the wireless tag might be temporarily stopped (such a phenomenon is also referred to as a power flicker or instantaneous power interruption (hereinafter referred to as a power flicker)). When the supply of power supply voltage to the internal circuit in the wireless tag is stopped, the wireless tag cannot transmit a predetermined response to the reader/writer. In addition, data retained in a flip-flop functioning as a register or the like provided in a circuit for performing signal processing (e.g., a signal processing circuit such as a CPU) of the internal circuit in the wireless tag is lost. Consequently, even when the supply of power supply voltage to the internal circuit in the wireless tag is immediately restarted, it is necessary to restart a command sequence from the beginning.

In view of the above, it is an object to provide a communication system and a communication method that can restart a command sequence from the middle even when supply of power supply voltage to an internal circuit in a wireless tag is temporarily stopped (a power flicker occurs).

One embodiment of a communication method according to the present invention is a communication method using a wireless tag that generates power supply voltage only when the wireless tag receives an electromagnetic wave emitted from a reader/writer. The communication method includes a command sequence for performing a step of transmitting a command from the reader/writer by modulation of an electromagnetic wave, a step of receiving the command by the wireless tag, a step of performing signal processing in a signal processing circuit included in the wireless tag on the basis of the command, a step of retaining data retained in a plurality of flip-flops each functioning as a register or a cache memory included in the signal processing circuit in separate nonvolatile storage circuits, a step of transmitting a response based on the result of the signal processing from the wireless tag to the reader/writer by modulation of the electromagnetic wave, and a step of receiving the response by the reader/writer more than once. When generation of power supply voltage is restarted after the command sequence is interrupted by stop of the generation of the power supply voltage in the wireless tag, data retained in the nonvolatile storage circuits is input to the plurality of flip-flops, the signal processing circuit performs signal processing using the data, the wireless tag transmits a response based on the result of the signal processing to the reader/writer by modulation of the electromagnetic wave, the reader/writer receives the response, the reader/writer transmits a command based on the response by modulation of the electromagnetic wave, and the interrupted command sequence is restarted.

One embodiment of a communication system according to the present invention includes a passive wireless tag and a reader/writer for performing wireless communication with the wireless tag. The wireless tag includes a signal processing circuit for performing signal processing on the basis of a command received from the reader/writer. The signal processing circuit includes a register or a cache memory. The register or the cache memory includes plural sets of a flip-flop and a nonvolatile storage circuit for storing data retained in the flip-flop.

The nonvolatile storage circuit can include a transistor whose off-state current is extremely low and a capacitor whose one of a pair of electrodes is electrically connected to a node that is set in a floating state when the transistor is turned off (hereinafter such a node is also referred to as a holding node). Here, the nonvolatile storage circuit can be electrically connected to the flip-flop so that the potential of a node in which data in the flip-flop is retained is input to the holding node through the transistor. Note that the gate capacitance or the like of a different transistor can be used instead of providing a capacitor. For example, the holding node can be electrically connected to a gate of a transistor included in an arithmetic circuit or the like in the signal processing circuit. In that case, it is not always necessary to provide the capacitor whose one of a pair of electrodes is electrically connected to the holding node.

In such a nonvolatile storage circuit, a transistor whose off-state current is extremely low is turned on by input of a first power supply potential (a potential that is not 0 V) to a gate of the transistor. Then, a predetermined potential (a potential corresponding to data retained in a flip-flop) is input to and retained in a holding node through the transistor which is turned on. Here, the transistor whose off-state current is extremely low is an enhancement (normally off) transistor. When a wireless tag cannot generate power supply voltage (a predetermined potential that is not 0 V, for example, which corresponds to the first power supply potential) and supply of power supply voltage to a signal processing circuit is stopped, a ground potential (0 V, which corresponds to a second power supply potential) is input to the gate of the transistor. For example, the gate of the transistor is grounded through a load such as a resistor. Accordingly, the transistor is turned off after supply of power supply voltage to the signal processing circuit is stopped, so that it is possible to continue to hold the potential of the holding node. Thus, a register or a cache memory included in the signal processing circuit can continue to retain data even after supply of power supply voltage is stopped.

Data is stored in such a nonvolatile storage circuit after a signal potential corresponding to the data is input to a holding node, a transistor whose off-state current is extremely low is turned off, and the holding node is set in a floating state. Thus, the nonvolatile storage circuit does not easily cause degradation due to repetitive data rewriting, and rewritability can be improved. For example, the nonvolatile storage circuit can have higher rewritability than a ferroelectric memory, a flash memory, or the like.

As a transistor whose off-state current is extremely low, it is possible to use a transistor whose channel is formed in a layer or substrate including a semiconductor whose bandgap is wider than that of silicon. A compound semiconductor is an example of the semiconductor whose bandgap is wider than that of silicon. Examples of the compound semiconductor include an oxide semiconductor and a nitride semiconductor. A transistor whose channel is formed in an oxide semiconductor layer can be used as the transistor whose off-state current is extremely low, for example.

Note that a signal processing circuit of the present invention includes, in its category, a large scale integrated circuit (LSI) such as a CPU or a microprocessor.

A register or a cache memory included in a signal processing circuit in a wireless tag can continue to retain data even after supply of power supply voltage is stopped. Thus, when the wireless tag starts to generate power supply voltage again after a command sequence is interrupted because the wireless tag cannot generate power supply voltage, the signal processing circuit in the wireless tag is returned to the state before the supply of power supply voltage is stopped and can restart signal processing. Consequently, the command sequence can be restarted from the middle. In other words, it is not necessary to restart the command sequence from the beginning after supply of power supply voltage to the internal circuit in the wireless tag is temporarily stopped (a power flicker occurs); thus, communication can be performed at high speed.

DETAILED DESCRIPTION OF THE INVENTION

Figure 1A:
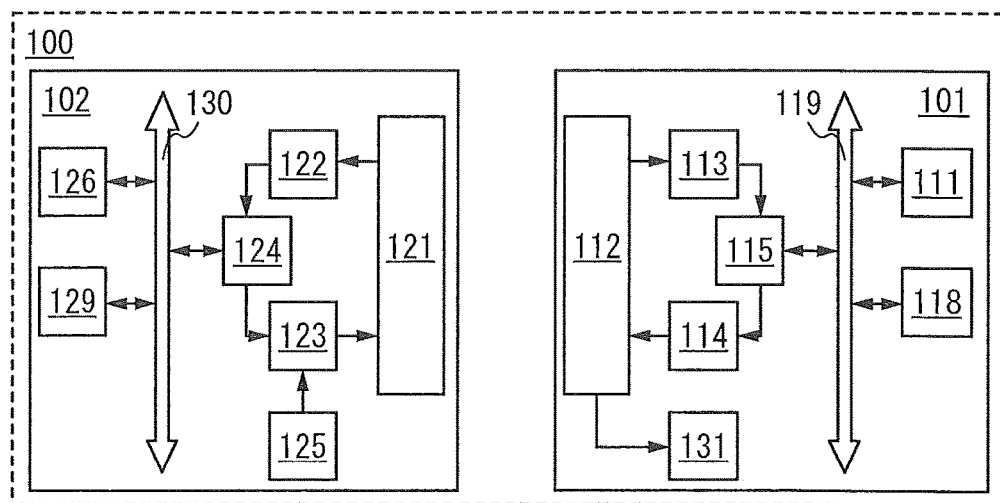
FIG. 1A is a block diagram illustrating the structure of a communication system.

Embodiments and examples will be described in detail below with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments and the examples.

Note that the functions of a "source" and a "drain" might interchange when a transistor of opposite polarity is used or the direction of current flow is changed in circuit operation, for example. Thus, in this specification, the terms "source" and "drain" can interchange.

An expression "electrically connected" means that components are connected to each other through an object having any electric action. Here, there is no particular limitation on an object having any electric action as long as electric signals can be transmitted and received between components that are connected to each other. Examples of an object having any electric action include an electrode, a wiring, a switching element such as a transistor, a resistor, an inductor, a capacitor, and an element with a variety of functions.

Even when independent components are electrically connected to each other in a circuit diagram, one conductive film might have functions of a plurality of components, for example, part of a wiring also functions as an electrode. The expression "electrically connected" in this specification also means that one conductive film has functions of a plurality of components.

A term "over" or "below" does not necessarily mean that a component is placed "directly on" or "directly under" another component. For example, an expression "a gate electrode over a gate insulating layer" does not exclude the case where another component is placed between the gate insulating layer and the gate electrode.

The position, size, range, or the like of each component illustrated in drawings and the like is not accurately represented for easy understanding in some cases. Thus, the disclosed invention is not necessarily limited to the position, size, range, or the like disclosed in the drawings and the like.

Ordinal numbers such as "first", "second", and "third" are used in order to avoid confusion among components.

Embodiment 1

In this embodiment, one aspect of a communication system according to the present invention is described. FIG. 1A is a block diagram illustrating one aspect of a communication system.

In FIG. 1A, a communication system 100 includes a wireless tag 101 and a reader/writer 102 for performing wireless communication with the wireless tag 101.

The wireless tag 101 can include a signal processing circuit 111, an antenna 112, a demodulation circuit 113, a modulation circuit 114, an encoder/decoder circuit 115, a memory portion 118, a bus 119, and a power supply circuit 131. The signal processing circuit 111, the encoder/decoder circuit 115, and the memory portion 118 are electrically connected to each other through the bus 119 and input and output data mutually.

The antenna 112 transmits a modulated signal generated in the modulation circuit 114 by wireless communication. The antenna 112 receives an electromagnetic wave transmitted from the reader/writer 102 and inputs the electromagnetic wave to the demodulation circuit 113. The power supply circuit 131 generates power supply voltage (a potential that is not a ground potential (0 V), for example, which corresponds to a first power supply potential) with the use of the electromagnetic wave received in the antenna 112. The generated power supply voltage is supplied to an internal circuit in the wireless tag 101 (e.g., the signal processing circuit 111). The demodulation circuit 113 demodulates the electromagnetic wave received in the antenna 112 (corresponding to a modulated signal obtained by modulation of a predetermined carrier wave) and inputs a command obtained by the demodulation to the encoder/decoder circuit 115. The encoder/decoder circuit 115 decodes the command input from the demodulation circuit 113 and inputs the decoded command to the signal processing circuit 111 through the bus 119. The signal processing circuit 111 performs predetermined signal processing on the basis of the input command and outputs a response. The encoder/decoder circuit 115 encodes the response input from the signal processing circuit 111 through the bus 119 and outputs the encoded response to the modulation circuit 114. The modulation circuit 114 generates a modulated signal obtained by modulation of a predetermined carrier wave on the basis of a signal input from the encoder/decoder circuit 115 and outputs the modulated signal to the antenna 112. The memory portion 118 stores data such as a program. Data stored in the memory portion 118 is read and the read data is input to the signal processing circuit 111 through the bus 119. As the memory portion 118, for example, a hard disk, a flash memory, an electrically erasable programmable read only memory (EEPROM), a magnetoresistive random access memory (MRAM), a ferroelectric random access memory (FeRAM), or the like can be used.

With the above structure, the wireless tag 101 receives a command. Further, the wireless tag 101 transmits a response.

The reader/writer 102 can include an antenna 121, a demodulation circuit 122, a modulation circuit 123, an encoder/decoder circuit 124, an oscillator circuit 125, a signal processing circuit 126, a memory portion 129, and a bus 130. The signal processing circuit 126, the encoder/decoder circuit 124, and the memory portion 129 are electrically connected to each other through the bus 130 and input and output data mutually.

The antenna 121 transmits a modulated signal generated in the modulation circuit 123 by wireless communication. The antenna 121 receives an electromagnetic wave transmitted from the wireless tag 101 and inputs the electromagnetic wave to the demodulation circuit 122. The demodulation circuit 122 demodulates the electromagnetic wave received in the antenna 121 (corresponding to a modulated signal obtained by modulation of a predetermined carrier wave) and inputs a response obtained by the demodulation to the encoder/decoder circuit 124. The encoder/decoder circuit 124 decodes the response input from the demodulation circuit 122 and inputs the decoded response to the signal processing circuit 126 through the bus 130. The signal processing circuit 126 performs predetermined signal processing on the basis of the input response and outputs a command. The encoder/decoder circuit 124 encodes the command input from the signal processing circuit 126 through the bus 130 and outputs the encoded command to the modulation circuit 123. The oscillator circuit 125 generates a carrier wave having a predetermined frequency and inputs the carrier wave to the modulation circuit 123. The modulation circuit 123 generates a modulated signal obtained by modulation of the carrier wave input from the oscillator circuit 125 on the basis of a signal input from the encoder/decoder circuit 124 and outputs the modulated signal to the antenna 121. The memory portion 129 stores data such as a program. Data stored in the memory portion 129 is read and the read data is input to the signal processing circuit 126 through the bus 130. As the memory portion 129, for example, a hard disk, a flash memory, an electrically erasable programmable read only memory (EEPROM), a magnetoresistive random access memory (MRAM), a ferroelectric random access memory (FeRAM), or the like can be used.

With the above structure, the reader/writer 102 transmits a command. Further, the reader/writer 102 receives a response.

With the communication system 100, a predetermined command sequence can be performed by wireless communication.

Here, the signal processing circuit 111 can include plural sets of a flip-flop and a nonvolatile storage circuit for storing data retained in the flip-flop. The plural sets can function as registers in the signal processing circuit 111. Further, the plural sets can function as cache memories. Even when the antenna 112 in the wireless tag 101 cannot receive an electromagnetic wave from the reader/writer 102, for example, the power supply circuit 131 cannot generate power supply voltage, and supply of power supply voltage to the signal processing circuit 111 is stopped, data retained in the flip-flop is retained in the nonvolatile storage circuit. In this manner, the register or the cache memory included in the signal processing circuit 111 can continue to retain data even after supply of power supply voltage is stopped.

Figure 1B:
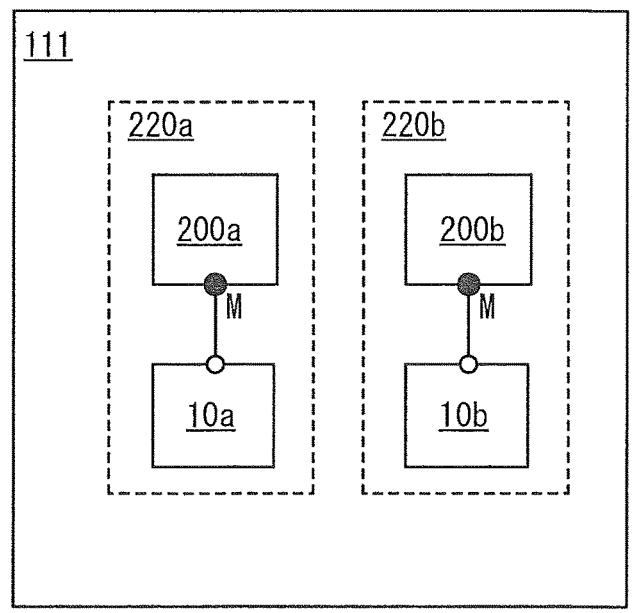
FIG. 1B is a block diagram illustrating the structure of a signal processing circuit included in a wireless tag.

FIG. 1B schematically illustrates the structure of the signal processing circuit 111. The signal processing circuit 111 includes a set 220a of a flip-flop 200a and a nonvolatile storage circuit 10a for storing data retained in the flip-flop 200a (for example, corresponding to the potential of a node M (indicated by "M" in FIG. 1B) in the flip-flop 200a) and a set 220b of a flip-flop 200b and a nonvolatile storage circuit 10b for storing data retained in the flip-flop 200b (for example, corresponding to the potential of a node M (indicated by "M" in FIG. 1B) in the flip-flop 200b). Note that although FIG. 1B illustrates two sets of a flip-flop and a nonvolatile storage circuit as a typical example, the signal processing circuit 111 can include any number of sets of a flip-flop and a nonvolatile storage circuit. The sets of a flip-flop and a nonvolatile storage circuit that are included in the signal processing circuit 111 (e.g., the set 220a and the set 220b in FIG. 1B) can function as registers. Further, the sets can function as cache memories. Even when the antenna 112 in the wireless tag 101 cannot receive an electromagnetic wave from the reader/writer 102, for example, the power supply circuit 131 cannot generate power supply voltage, and supply of power supply voltage to the signal processing circuit 111 is stopped, data retained in the flip-flop 200a and the flip-flop 200b is retained in the nonvolatile storage circuit 10a and the nonvolatile storage circuit 10b. In this manner, the register or the cache memory included in the signal processing circuit 111 can continue to retain data even after supply of power supply voltage is stopped.

A set of a flip-flop and a nonvolatile storage circuit (e.g., the set 220a or the set 220b) is hereinafter referred to as a set 220, and the set 220 is described below as including a flip-flop 200 and a nonvolatile storage circuit 10.

Specific structures of the set 220 are described with reference to FIGS. 3A to 3E. Note that the reference numerals in FIGS. 1A and 1B are used for the description.

(Structure 1 of Set)

Figure 3A:
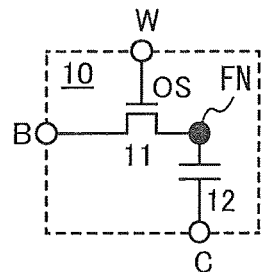
FIGS. 3A to 3E each illustrate the structure of a set of a flip-flop and a nonvolatile storage circuit that are included in a signal processing circuit.
Figure 3C:
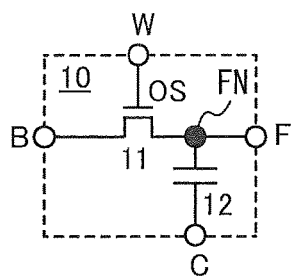
Figure 3B:
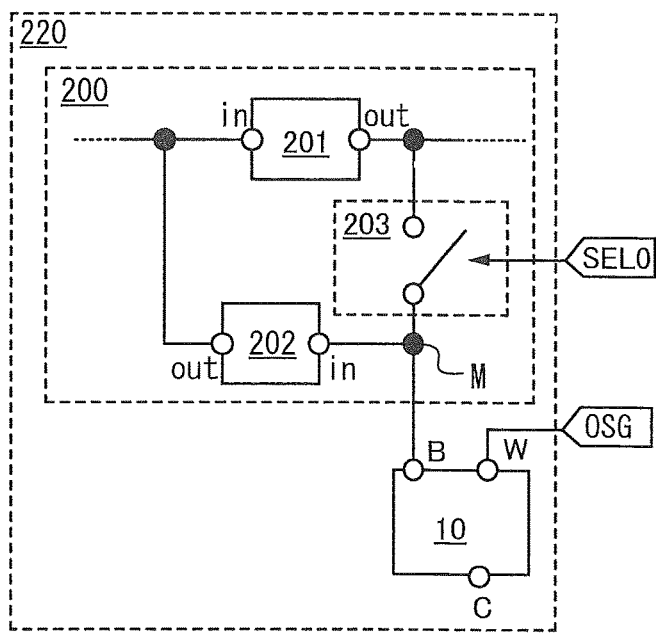

FIG. 3B illustrates one aspect of the set 220 of the flip-flop 200 and the nonvolatile storage circuit 10.

FIG. 3A illustrates one aspect of the structure of the nonvolatile storage circuit 10 in FIG. 3B. In FIG. 3A, the nonvolatile storage circuit 10 includes a transistor 11 and a capacitor 12. Note that in FIG. 3A, "OS" is written beside the transistor 11 in order to indicate that a channel of the transistor 11 is formed in an oxide semiconductor layer. A gate of the transistor 11 is electrically connected to a terminal W. One of a source and a drain of the transistor 11 is electrically connected to a terminal B. The other of the source and the drain of the transistor 11 is electrically connected to one of a pair of electrodes of the capacitor 12. The other of the pair of electrodes of the capacitor 12 is electrically connected to a terminal C. One of the pair of electrodes of the capacitor 12 is referred to as a holding node and is indicated by FN in the drawing.

Note that gate capacitance or the like of a different transistor can be used instead of providing the capacitor 12. For example, in the case where the holding node FN is electrically connected to a gate of a transistor included in an arithmetic circuit or the like in the signal processing circuit 111, it is not always necessary to provide the capacitor 12.

The nonvolatile storage circuit 10 stores data by control of the potential of the holding node FN (or the amount of electric charge corresponding to the potential) depending on the data. For example, nonvolatile storage circuit 10 can store 1-bit data when a state in which predetermined electric charge is held in the capacitor 12 corresponds to "1" and a state in which electric charge is not held in the capacitor 12 corresponds to "0". Since the off-state current of the transistor 11 is extremely low, when the transistor 11 is turned off, the potential of the holding node FN (i.e., data) can be held in the nonvolatile storage circuit 10 for a long time. Further, data is stored in the nonvolatile storage circuit 10 after a signal potential corresponding to the data is input to the holding node FN, the transistor 11 is turned off, and the holding node FN is set in a floating state. Thus, the nonvolatile storage circuit 10 does not easily cause degradation due to repetitive data rewriting, and rewritability can be improved.

The flip-flop 200 in FIG. 3B includes an arithmetic circuit 201, an arithmetic circuit 202, and a feedback loop in which an output from the arithmetic circuit 201 is input to the arithmetic circuit 202 and an output from the arithmetic circuit 202 is input to the arithmetic circuit 201. Note that a clock signal may be input to either one or both the arithmetic circuit 201 and the arithmetic circuit 202.

In FIG. 3B, the terminal B of the nonvolatile storage circuit 10 is electrically connected to a node M that exists between an input terminal of the arithmetic circuit 202 and an output terminal of the arithmetic circuit 201. Here, the node M corresponds to one of nodes for retaining data in the flip-flop 200. The flip-flop 200 further includes a switch 203 for selecting electrical connection between the node M and the output terminal of the arithmetic circuit 201. On or off of the switch 203 is selected by a control signal SEL0. Note that in the case where the arithmetic circuit 201 selectively outputs a signal in response to a control signal (e.g., a clock signal), the switch 203 is not necessarily provided, and it is possible not to provide the switch 203. A control signal OSG is input to the terminal W of the nonvolatile storage circuit 10. Note that a fixed potential (e.g., a ground potential) can be input to the terminal C of the nonvolatile storage circuit 10.

(Method for Driving Set with Structure 1)

When power supply voltage is supplied from the power supply circuit 131 to the signal processing circuit 111 and the switch 203 is on by the control signal SEL0 in the set 220 illustrated in FIG. 3B, the flip-flop 200 retains data with the feedback loop constituted of the arithmetic circuit 201 and the arithmetic circuit 202. In other words, in the set illustrated in FIG. 3B, data input is retained with the feedback loop of the flip-flop 200, and the data is output from the feedback loop of the flip-flop 200. The feedback loop of the flip-flop 200 can retain and output the data at high speed.

The transistor 11 is turned on under the condition that the control signal OSG is used as the first power supply potential. In this manner, in the nonvolatile storage circuit 10, a potential corresponding to data retained in the flip-flop 200 (the potential of the node M) is input to the holding node FN through the transistor 11 which is on.

Here, the transistor 11 is an enhancement (normally off) transistor. When the wireless tag 101 cannot generate power supply voltage and supply of power supply voltage to the signal processing circuit 111 is stopped, a ground potential (0 V, which corresponds to a second power supply potential) is input to the gate of the transistor 11. In other words, the ground potential is input as the control signal OSG. For example, the gate of the transistor 11 is grounded through a load such as a resistor. Accordingly, the transistor 11 is turned off after supply of power supply voltage to the signal processing circuit 111 is stopped, so that it is possible to continue to hold the potential of the holding node FN. Thus, a circuit (e.g., a register or a cache memory) constituted of the set 220 in the signal processing circuit 111 can continue to retain data even after supply of power supply voltage is stopped.

After supply of power supply voltage to the signal processing circuit 111 is restarted, the switch 203 is turned off by the control signal SEL0 and the transistor 11 in the nonvolatile storage circuit 10 is turned on under the condition that the control signal OSG is used as the first power supply potential. Thus, the potential of the holding node FN in the nonvolatile storage circuit 10 (or the amount of electric charge corresponding to the potential) is input to the node M in the flip-flop 200. Then, the switch 203 is turned on by the control signal SEL0. Accordingly, data retained in the nonvolatile storage circuit 10 is input to the flip-flop 200 so that the feedback loop can retain the data. In this manner, the register or the cache memory included in the signal processing circuit 111 can be returned to the state before the supply of power supply voltage is stopped, so that the signal processing circuit 111 can output a predetermined response.

Note that in the case where the arithmetic circuit 201 is a circuit (e.g., a clocked inverter or a three-state buffer) for selectively outputting a signal in response to a control signal (e.g., a clock signal) and the switch 203 is not provided, when the switch 203 is turned off in the above description, the arithmetic circuit 201 is controlled so that the arithmetic circuit 201 does not output a signal (i.e., an output of the arithmetic circuit 201 is a restricted combination). A method for driving circuits except the arithmetic circuit 201 can be similar to the above method.

(Structure 2 of Set)

Figure 3D:
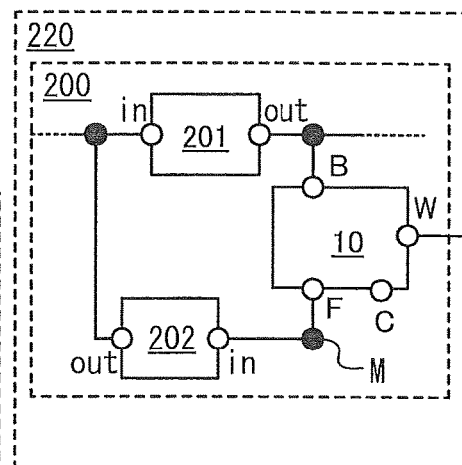
Figure 3E:
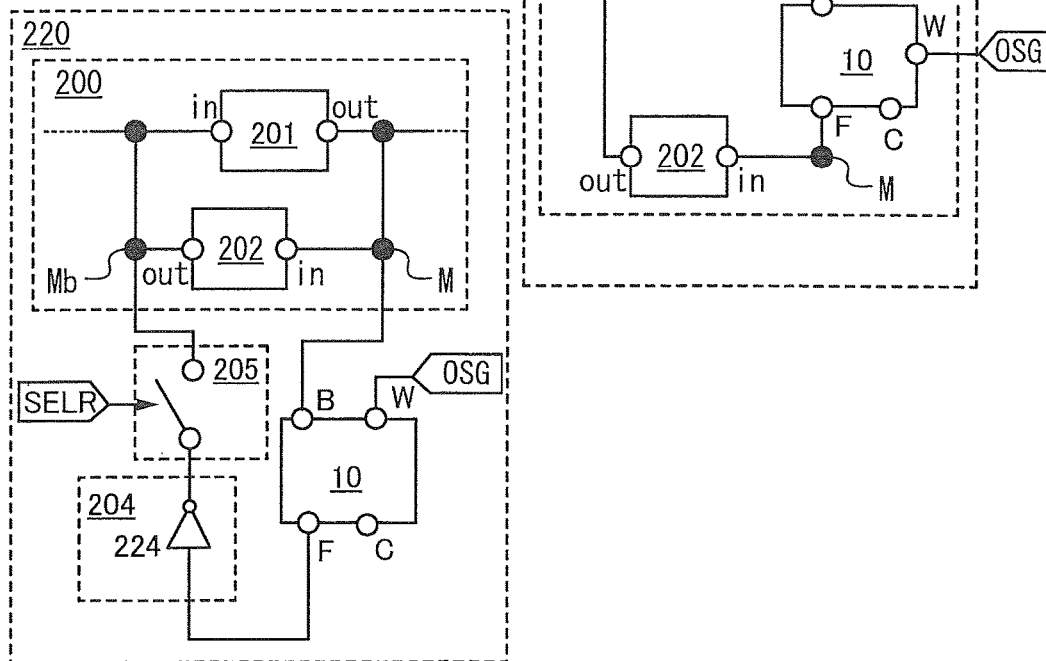

The structure of the set 220 is not limited to the structure illustrated in FIG. 3B. For example, the structure of the set 220 can be a structure illustrated in FIG. 3E. In FIG. 3E, the same portions as those in FIG. 3B are denoted by the same reference numerals and a description thereof is omitted. In the set 220 in FIG. 3E, the switch 203 in FIG. 3B is not provided because the switch 203 is not necessarily needed. A terminal F of the nonvolatile storage circuit 10 in FIG. 3E is electrically connected to one of the pair of electrodes of the capacitor 12, as illustrated in FIG. 3C. In FIG. 3E, the terminal F of the nonvolatile storage circuit 10 is electrically connected to an output terminal of the arithmetic circuit 202 and an input terminal of the arithmetic circuit 201 in the flip-flop 200 through an arithmetic circuit 204 and a switch 205. An inverter 224 can be used as the arithmetic circuit 204, for example. Note that the arithmetic circuit 204 is not limited thereto, and a given circuit for inverting the phase of a signal input and outputting the signal can be used. On or off of the switch 205 is selected by a control signal SELR.

(Method for Driving Set with Structure 2)

When power supply voltage is supplied from the power supply circuit 131 to the signal processing circuit 111 and the switch 205 is off by the control signal SELR in the set 220 illustrated in FIG. 3E, the flip-flop 200 retains data with the feedback loop constituted of the arithmetic circuit 201 and the arithmetic circuit 202. In other words, in the set 220 illustrated in FIG. 3E, data input is retained with the feedback loop of the flip-flop 200, and the data is output from the feedback loop of the flip-flop 200. The feedback loop of the flip-flop 200 can retain and output the data at high speed.

The transistor 11 is turned on under the condition that the control signal OSG is used as the first power supply potential. In this manner, in the nonvolatile storage circuit 10, a potential corresponding to data retained in the flip-flop 200 (the potential of the node M) is input to the holding node FN through the transistor 11 which is on.

Here, the transistor 11 is an enhancement (normally off) transistor. When the wireless tag 101 cannot generate power supply voltage and supply of power supply voltage to the signal processing circuit 111 is stopped, a ground potential (0 V, which corresponds to the second power supply potential) is input to the gate of the transistor 11. In other words, the ground potential is input as the control signal OSG. For example, the gate of the transistor 11 is grounded through a load such as a resistor. Accordingly, the transistor 11 is turned off after supply of power supply voltage to the signal processing circuit 111 is stopped, so that it is possible to continue to hold the potential of the holding node FN. Thus, a circuit (e.g., a register or a cache memory) constituted of the set 220 in the signal processing circuit 111 can continue to retain data even after supply of power supply voltage is stopped.

After supply of power supply voltage to the signal processing circuit 111 is restarted, the transistor 11 in the nonvolatile storage circuit 10 is kept off and the switch 205 is turned on by the control signal SELR. Thus, the potential of the holding node FN in the nonvolatile storage circuit 10 (or the amount of electric charge corresponding to the potential) is converted into a predetermined potential by the arithmetic circuit 204, and the predetermined potential is input to a node Mb in the flip-flop 200. Accordingly, data retained in the nonvolatile storage circuit 10 is input to the flip-flop 200 so that the feedback loop can retain the data. In this manner, the register or the cache memory included in the signal processing circuit 111 can be returned to the state before the supply of power supply voltage is stopped, so that the signal processing circuit 111 can output a predetermined response.

Note that when the arithmetic circuit 202 is a circuit (e.g., a clocked inverter or a three-state buffer) for selectively outputting a signal in response to a control signal (e.g., a clock signal) and the switch 205 is turned on in the above description, the arithmetic circuit 202 is preferably controlled so that the arithmetic circuit 202 does not output a signal (i.e., an output of the arithmetic circuit 202 is a restricted combination). In this manner, it is easy to set the potential of the node Mb in the flip-flop 200 to a potential output from the arithmetic circuit 204.

Note that a structure can be used in which the arithmetic circuit 204 is a circuit (e.g., a clocked inverter or a three-state buffer) for selectively outputting a signal in response to a control signal (e.g., a clock signal) and the switch 205 is not provided. In that case, when the switch 205 is turned off in the above description, the arithmetic circuit 204 is controlled so that the arithmetic circuit 204 does not output a signal (i.e., an output of the arithmetic circuit 204 is a restricted combination). A method for driving circuits except the arithmetic circuit 204 can be similar to the above method.

(Structure 3 of Set)

The structure of the set 220 is not limited to the structure illustrated in FIG. 3B or FIG. 3E. For example, the structure of the set 220 can be a structure illustrated in FIG. 3D. In FIG. 3D, the same portions as those in FIG. 3B are denoted by the same reference numerals and a description thereof is omitted. In the set 220 in FIG. 3D, the nonvolatile storage circuit 10 is included in the flip-flop 200. A terminal F of the nonvolatile storage circuit 10 in FIG. 3D is electrically connected to the holding node FN, as illustrated in FIG. 3C.

(Method for Driving Set with Structure 3)

When power supply voltage is supplied from the power supply circuit 131 to the signal processing circuit 111 and the transistor 11 is on under the condition that the control signal OSG is used as the first power supply potential in the set 220 illustrated in FIG. 3D, the flip-flop 200 retains data with the feedback loop constituted of the arithmetic circuit 201 and the arithmetic circuit 202. In other words, in the set illustrated in FIG. 3D, data input is retained with the feedback loop of the flip-flop 200, and the data is output from the feedback loop of the flip-flop 200. The feedback loop of the flip-flop 200 can retain and output the data at high speed.

The potential of the holding node FN in the nonvolatile storage circuit 10 is a potential corresponding to data retained in the flip-flop 200 (the potential of the node M).

Here, the transistor 11 is an enhancement (normally off) transistor. When the wireless tag 101 cannot generate power supply voltage and supply of power supply voltage to the signal processing circuit 111 is stopped, a ground potential (0 V, which corresponds to the second power supply potential) is input to the gate of the transistor 11. In other words, the ground potential is input as the control signal OSG. For example, the gate of the transistor 11 is grounded through a load such as a resistor. Accordingly, the transistor 11 is turned off after supply of power supply voltage to the signal processing circuit 111 is stopped, so that it is possible to continue to hold the potential of the holding node FN. Thus, a circuit (e.g., a register or a cache memory) constituted of the set 220 in the signal processing circuit 111 can continue to retain data even after supply of power supply voltage is stopped.

After supply of power supply voltage to the signal processing circuit 111 is restarted, the transistor 11 in the nonvolatile storage circuit 10 is turned on under the condition that the control signal OSG is used as the first power supply potential. Consequently, the feedback loop in the flip-flop 200 can retain data retained in the nonvolatile storage circuit 10. In this manner, the register or the cache memory included in the signal processing circuit 111 can be returned to the state before the supply of power supply voltage is stopped, so that the signal processing circuit 111 can output a predetermined response.

The above is the description of the plural sets 220 included in the signal processing circuit 111. Note that as the plural sets 220 included in the signal processing circuit 111, the sets 220 with Structures 1 to 3 can be freely combined with each other. For example, the signal processing circuit 111 may have the sets 220 with different structures. Alternatively, in the plural sets 220 included in the signal processing circuit 111, the flip-flops 200 may have either the same structure or different structures.

With the use of the communication system 100, the register or the cache memory included in the signal processing circuit 111 in the wireless tag 101 can continue to retain data even after supply of power supply voltage is stopped. Thus, when the wireless tag 101 starts to generate power supply voltage again after a command sequence is interrupted because the wireless tag 101 cannot generate power supply voltage, the signal processing circuit 111 included in the wireless tag 101 is returned to the state before the supply of power supply voltage is stopped and can restart signal processing. Consequently, the command sequence can be restarted from the middle. In other words, it is not necessary to restart the command sequence from the beginning after supply of power supply voltage to the internal circuit in the wireless tag 101 is temporarily stopped (a power flicker occurs); thus, communication can be performed at high speed.

This embodiment can be freely combined with any of the other embodiments.

Embodiment 2

In this embodiment, one aspect of a communication method according to the present invention is described. Note that a communication system using the communication method can have the structure described in Embodiment 1. Thus, the following description is made with reference to FIGS. 1A and 1B and FIGS. 3A to 3E, and the reference numerals in FIGS. 1A and 1B and FIGS. 3A to 3E are also used.

Figure 2A:
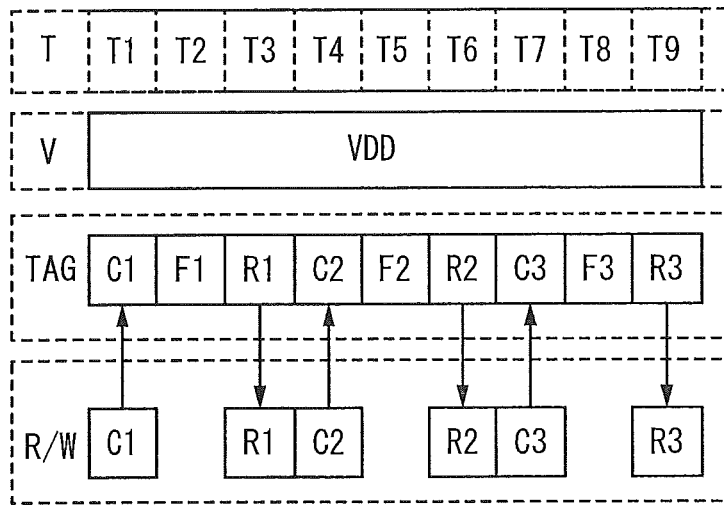
FIGS. 2A and 2B are timing charts each illustrating a communication method.
Figure 2B:
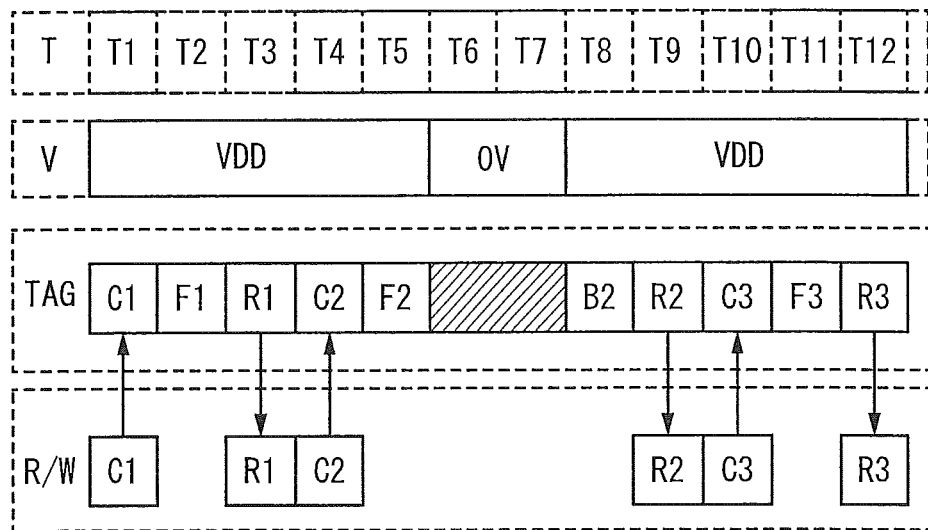

FIGS. 2A and 2B are timing charts each illustrating one aspect of a communication method. In FIGS. 2A and 2B, "T" represents a period; "tag" represents signal processing performed by the wireless tag 101; "R/W" represents signal processing performed by the reader/writer 102; and "V" represents power supply voltage generated in the power supply circuit 131 in the wireless tag 101. FIG. 2A is a timing chart showing the case where temporary stop of supply of power supply voltage to the internal circuit in the wireless tag 101 does not occur (a power flicker does not occur). FIG. 2B is a timing chart showing the case where a power flicker occurs.

(Case where Power Flicker does not Occur)

In the case where a power flicker does not occur, in periods during which a command sequence is performed (periods T1 to T9 in FIG. 2A), the power supply circuit 131 in the wireless tag 101 generates predetermined voltage and supplies the predetermined voltage to the internal circuit (e.g., the signal processing circuit 111); thus, V is VDD (predetermined voltage which is not 0 V).

In the period T1 in FIG. 2A, the reader/writer 102 transmits a command C1 to the wireless tag 101, the wireless tag 101 receives the command C1, and the signal processing circuit 111 in the wireless tag 101 performs signal processing on the basis of the command C1 (indicated by "C1" in FIG. 2A).

Then, in the period T2, in plural sets of the signal processing circuit 111 in the wireless tag 101 (the sets 220 of the flip-flop 200 and the nonvolatile storage circuit 10), data retained in the flip-flop 200 is retained in the nonvolatile storage circuit 10 (indicated by "F1" in FIG. 2A). In other words, the potential of the node M in the flip-flop 200 is input to the holding node FN in the nonvolatile storage circuit 10. Since the details of this operation are described in Embodiment 1, a description thereof is omitted. Note that the operation in the period T2 (input of the potential of the node M in the flip-flop 200 to the holding node FN in the nonvolatile storage circuit 10) can be performed at the same time as (in parallel with) signal processing by the signal processing circuit 111 on the basis of the command C1. In other words, the operation in the period T2 in FIG. 2A can be performed in the period T1.

In the period T3, the wireless tag 101 transmits a response R1 that is the result of the signal processing to the reader/writer 102, the reader/writer 102 receives the response R1, and the reader/writer 102 performs signal processing on the basis of the response R1 (indicated by "R1" in FIG. 2A). Then, in the period T4, the reader/writer 102 outputs a command C2 based on the response R1.

As illustrated in FIG. 2A, in the periods T4 to T6 and the periods T7 to T9, the command sequence is performed by repeating operation which is similar to the operation in the periods T1 to T3.
(Case where Power Flicker Occurs)

As illustrated in FIG. 2B, in periods T1 to T5 and periods T8 to T12, the power supply circuit 131 in the wireless tag 101 generates the predetermined voltage VDD (V is VDD) and supplies the predetermined voltage VDD to the internal circuit; however, in periods T6 and T7, a power flicker occurs, and supply of power supply voltage to the internal circuit is stopped (V is 0 V).

Operation in the periods T1 to T5 in FIG. 2B is similar to the operation in the periods T1 to T5 in FIG. 2A; thus, a description thereof is omitted.

In the period T6, when a power flicker occurs and V becomes 0 V, the wireless tag 101 cannot transmit the response R2 to the reader/writer 102. Thus, the command sequence is interrupted (indicated by slanted lines in FIG. 2B).

Also in the period T7, V is 0 V; thus, the wireless tag 101 cannot transmit a response to the reader/writer 102 (indicated by slanted lines in FIG. 2B).

In the period 8, the power supply circuit 131 in the wireless tag 101 restarts generation of power supply voltage, and V becomes VDD. Then, in each of the plural sets of the signal processing circuit 111 in the wireless tag 101 (the sets 220 of the flip-flop 200 and the nonvolatile storage circuit 10), data retained in the nonvolatile storage circuit 10 is input to the flip-flop 200 and the signal processing circuit 111 performs signal processing using the data (indicated by "B2" in FIG. 2B). In other words, by inputting the potential of the holding node FN in the nonvolatile storage circuit 10 (or a potential corresponding to the potential of the holding node FN) to a node for retaining data in the flip-flop 200 (for example, the node M in FIGS. 3B and 3D or the node Mb in FIG. 3E), data retained in the nonvolatile storage circuit 10 is retained in the feedback loop of the flip-flop 200, and then the signal processing circuit 111 performs signal processing using the data. Since the details of this operation are described in Embodiment 1, a description thereof is omitted.

In the period T9, the wireless tag 101 transmits a response R2 that is the result of the signal processing to the reader/writer 102, and the reader/writer 102 receives the response R2. Then, the reader/writer 102 performs signal processing on the basis of the response R2. Then, in the period T10, the reader/writer 102 outputs a command C3 based on the response R2.

Operation after the period T10 is similar to the operation after the period T7 in FIG. 2A.

In this manner, a command sequence interrupted by a power flicker can be restarted from the middle (transmission of the response R2 from the wireless tag 101).
(Variation of Case where Power Flicker Occurs)

Note that although FIG. 2B illustrates the case where a power flicker occurs when the wireless tag 101 transmits a response, this embodiment is not limited thereto. Even if a power flicker occurs when the wireless tag 101 receives a command, a command sequence can be similarly restarted from the middle.

For example, an example in which a power flicker occurs when the wireless tag 101 receives the command C3 in FIG. 2A is described. After a power flicker occurs, the power supply circuit 131 in the wireless tag 101 restarts generation of power supply voltage and V becomes VDD, and then operation which is similar to the operation "B2" in FIG. 2B is performed. Consequently, a command sequence interrupted by a power flicker can be restarted from the middle (transmission of the response R2 from the wireless tag 101).

By the above communication method, it is not necessary to restart a command sequence from the beginning after supply of power supply voltage to the internal circuit in the wireless tag 101 is temporarily stopped (a power flicker occurs); thus, communication can be performed at high speed.

FIGS. 2A and 2B each illustrate an example of a command sequence in which a command and a response corresponding to the command are transmitted and received three times; however, this embodiment is not limited thereto. The above communication method can be employed when a command sequence in which a command and a response corresponding to the command are transmitted and received given times is performed.

In addition, a given standards can be used as a standard for a command sequence. For example, a command sequence that conforms to FeliCa (registered trademark) can be used. Alternatively, for example, a command sequence that conforms to an NFC type 3 can be used. As described above, by a communication method according to the present invention, a command sequence can be restarted from the middle even when a power flicker occurs; thus, the communication method according to the present invention is particularly effective in communication that needs a long command sequence. For example, the communication method according to the present invention is particularly effective when a standard in which a command sequence where a command and a response corresponding to the command are transmitted and received many times is employed.

This embodiment can be freely combined with any of the other embodiments.

Embodiment 3

A method for forming the signal processing circuit 111 included in the wireless tag 101 is described. In this embodiment, a method for forming the signal processing circuit 111 is described giving the transistor 11 whose channel is formed in an oxide semiconductor layer and the capacitor 12 that are included in the nonvolatile storage circuit 10 illustrated in FIGS. 3A to 3E, and a transistor 133 included in the flip-flop 200 as examples. Here, the case where the transistor 133 is a transistor whose channel is formed in a silicon layer is given as an example.

Note that other transistors included in the signal processing circuit 111 can be formed in a manner similar to that of the transistor 133.

Figure 4A:
FIGS. 4A to 4D illustrate steps of forming a signal processing circuit.

First, as illustrated in FIG. 4A, an insulating film 701 and a semiconductor film 702 that is separated from a single crystal semiconductor substrate are formed over a substrate 700.

Although there is no particular limitation on a material which can be used as the substrate 700, it is necessary that the material have at least heat resistance high enough to withstand heat treatment to be performed later. For example, a glass substrate formed by a fusion process or a float process, a quartz substrate, a semiconductor substrate, a ceramic substrate, or the like can be used as the substrate 700. In the case where the temperature of the heat treatment to be performed later is high, a glass substrate whose strain point is 730° C. or higher is preferably used as a glass substrate.

In this embodiment, a method for forming the transistor 133 is described below giving the semiconductor film 702 formed using single crystal silicon as an example. Note that a specific example of a method for forming the single crystal semiconductor film 702 is briefly described. First, an ion beam including ions which are accelerated by an electric field enters a bond substrate which is the single crystal semiconductor substrate and a fragile layer which is fragile because of local disorder of the crystal structure is formed in a region at a certain depth from a surface of the bond substrate. The depth at which the fragile layer is formed can be adjusted by the acceleration energy of the ion beam and the angle at which the ion beam enters. Then, the bond substrate and the substrate 700 which is provided with the insulating film 701 are attached to each other so that the insulating film 701 is sandwiched therebetween. After the bond substrate and the substrate 700 overlap with each other, a pressure of approximately 1 to 500 N/cm$^2$, preferably 11 to 20 N/cm$^2$ is applied to part of the bond substrate and part of the substrate 700 so that the substrates are attached to each other. When the pressure is applied to part of the bond substrate and part of the substrate 700, bonding between the bond substrate and the insulating film 701 starts from the parts, which results in bonding of the entire surface where the bond substrate and the insulating film 701 are in close contact with each other. After that, heat treatment is performed, so that microvoids that exist in the fragile layer are combined, and the volume of the microvoids is increased. Accordingly, a single crystal semiconductor film which is part of the bond substrate is separated from the bond substrate along the fragile layer. The temperature of the heat treatment is set so as not to exceed the strain point of the substrate 700. Then, the single crystal semiconductor film is processed into a desired shape by etching or the like, so that the semiconductor film 702 can be formed.

In order to control the threshold voltage, an impurity element imparting p-type conductivity, such as boron, aluminum, or gallium, or an impurity element imparting n-type conductivity, such as phosphorus or arsenic, may be added to the semiconductor film 702. An impurity element may be added to the semiconductor film which is not etched to have a predetermined shape or the semiconductor film 702 which is etched to have a predetermined shape in order to control the threshold voltage. Alternatively, an impurity element may be added to the bond substrate in order to control the threshold voltage. Alternatively, an impurity element may be added to the bond substrate in order to roughly control the threshold voltage, and an impurity element may also be added to the semiconductor film which is not etched to have a predetermined shape or the semiconductor film 702 which is etched to have a predetermined shape in order to finely control the threshold voltage.

Note that although the single crystal semiconductor film is used in this embodiment, this embodiment is not limited to this structure. For example, a bulk semiconductor substrate that is isolated by shallow trench isolation (STI) or the like may be used. A polycrystalline, microcrystalline, or amorphous semiconductor film which is formed over the insulating film 701 by vapor deposition may be used, for example. Alternatively, the semiconductor film may be crystallized by a known technique. As a known crystallization method, laser crystallization using a laser beam or crystallization using a catalytic element can be used. Alternatively, crystallization using a catalytic element and laser crystallization can be used in combination. When a heat-resistant substrate such as a quartz substrate is used, any of thermal crystallization using an electrically heated oven, lamp heating crystallization using infrared light, crystallization using a catalytic element, and high-temperature heating at approximately 950° C. may be used in combination.

Figure 4B:
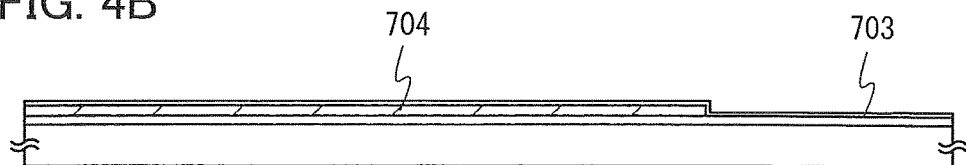

Next, as illustrated in FIG. 4B, a semiconductor layer 704 is formed using the semiconductor film 702. Then, an insulating film 703 functioning as a gate insulating film is formed over the semiconductor layer 704.

The insulating film 703 can be formed using a single layer or a stack of layers of a film including silicon oxide, silicon nitride oxide, silicon oxynitride, silicon nitride, hafnium oxide, aluminum oxide, tantalum oxide, yttrium oxide, hafnium silicate (HfSi$_x$O$_y$, (x>0, y>0)), hafnium aluminate (HfAl$_x$O$_y$), (x>0, y>0)), hafnium silicate (HfSi$_x$O$_y$, (x>0, y>0)) to which nitrogen is added, hafnium aluminate (HfAl$_x$O$_y$, (x>0, y>0)) to which nitrogen is added, or the like by plasma-enhanced CVD, sputtering, or the like, for example.

Note that in this specification, an oxynitride is a substance which includes more oxygen than nitrogen, and a nitride oxide is a substance which includes more nitrogen than oxygen.

The thickness of the insulating film 703 can be, for example, 1 to 100 nm, preferably 10 to 50 nm. In this embodiment, a single-layer insulating film containing silicon oxide is formed as the insulating film 703 by plasma-enhanced CVD.

Figure 4C:
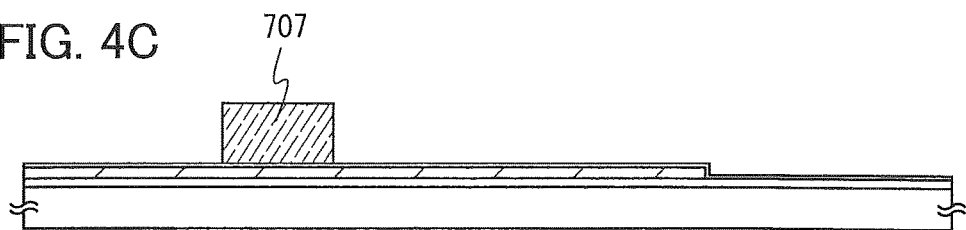

Then, as illustrated in FIG. 4C, a gate electrode 707 is formed.

A conductive film is formed and then is processed into a predetermined shape, so that the gate electrode 707 can be formed. The conductive film can be formed by CVD, sputtering, vapor deposition, spin coating, or the like. For the conductive film, tantalum (Ta), tungsten (W), titanium (Ti), molybdenum (Mo), aluminum (Al), copper (Cu), chromium (Cr), niobium (Nb), or the like can be used. An alloy containing the metal as its main component or a compound containing the metal may be used. Alternatively, the conductive film may be formed using a semiconductor such as polycrystalline silicon doped with an impurity element imparting conductivity, such as phosphorus, to the semiconductor film.

Note that although the gate electrode 707 is formed using a single-layer conductive film in this embodiment, this embodiment is not limited to this structure. The gate electrode 707 may be formed using a plurality of stacked conductive films.

As a combination of two conductive films, tantalum nitride or tantalum can be used for a first conductive film and tungsten can be used for a second conductive film. As well as the example, any of the following combinations can be used as the combination of two conductive films: tungsten nitride and tungsten; molybdenum nitride and molybdenum; aluminum and tantalum; aluminum and titanium; and the like. Since tungsten and tantalum nitride have high heat resistance, heat treatment for thermal activation can be performed in a step performed after the two conductive films are formed. Alternatively, as the combination of the two conductive films, for example, nickel silicide and silicon doped with an impurity element imparting n-type conductivity, tungsten silicide and silicon doped with an impurity element imparting n-type conductivity, or the like can be used.

In the case of a three-layer structure in which three conductive films are stacked, a layered structure of a molybdenum film, an aluminum film, and a molybdenum film can be used, for example.

A light-transmitting oxide conductive film of indium oxide, indium oxide-tin oxide, indium oxide-zinc oxide, zinc oxide, zinc aluminum oxide, zinc aluminum oxynitride, zinc gallium oxide, or the like can be used as the gate electrode 707.

Alternatively, the gate electrode 707 may be selectively formed by a droplet discharge method without the use of a mask. A droplet discharge method is a method for forming a predetermined pattern by discharge or ejection of a droplet containing a predetermined composition from an orifice, and includes an inkjet method in its category.

In addition, the gate electrode 707 can be formed in such a manner that a conductive film is formed and then is etched by inductively coupled plasma (ICP) etching under appropriately controlled conditions (e.g., the amount of electric power applied to a coiled electrode layer, the amount of electric power applied to an electrode layer on the substrate side, and the electrode temperature on the substrate side) to have a desired tapered shape. Further, an angle and the like of the tapered shape may be controlled by the shape of a mask. Note that for an etching gas, a chlorine-based gas such as chlorine, boron chloride, silicon chloride, or carbon tetrachloride; a fluorine-based gas such as carbon tetrafluoride, sulfur fluoride, or nitrogen fluoride; or oxygen can be used as appropriate.

Figure 4D:
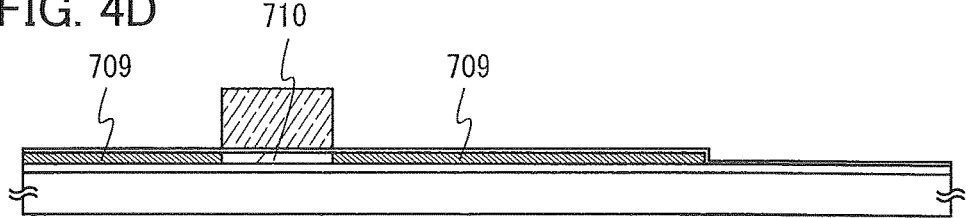

Next, as illustrated in FIG. 4D, when an impurity element imparting one conductivity is added to the semiconductor layer 704 with the gate electrode 707 used as a mask, a channel formation region 710 overlapping with the gate electrode 707 and a pair of impurity regions 709 sandwiching the channel formation region 710 are formed in the semiconductor layer 704.

In this embodiment, an impurity element imparting p-type conductivity (e.g., boron) is added to the semiconductor layer 704.

Figure 5A:
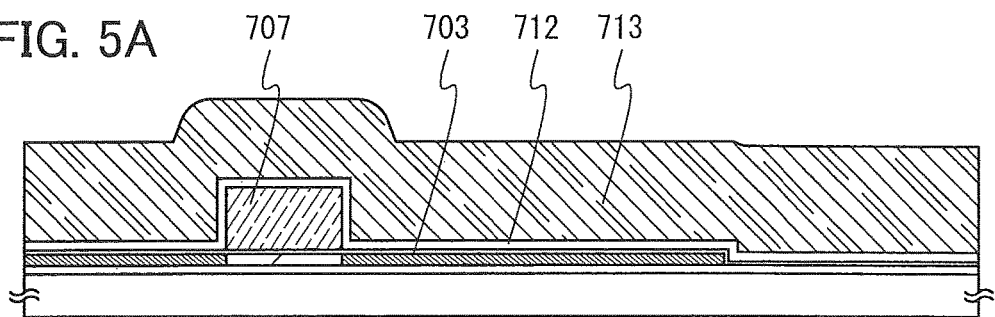
FIGS. 5A to 5D illustrate steps of forming a signal processing circuit.

Next, as illustrated in FIG. 5A, insulating films 712 and 713 are formed to cover the gate insulating film 703 and the gate electrode 707. Specifically, inorganic insulating films of silicon oxide, silicon nitride, silicon nitride oxide, silicon oxynitride, aluminum nitride, aluminum nitride oxide, or the like can be used as the insulating films 712 and 713. In particular, the insulating films 712 and 713 are preferably formed using low dielectric constant (low-k) materials because capacitance due to overlapping of electrodes or wirings can be substantially reduced. Note that porous insulating films including such a material may be used as the insulating films 712 and 713. Since the porous insulating film has lower dielectric constant than a dense insulating layer, parasitic capacitance due to overlapping of electrodes or wirings can be further reduced.

In this embodiment, silicon oxynitride is used for the insulating film 712, and silicon nitride oxide is used for the insulating film 713. In addition, although the insulating films 712 and 713 are formed over the gate electrode 707 in this embodiment, in the present invention, only one insulating film may be formed over the gate electrode 707, or a plurality of insulating films of three or more layers may be stacked over the gate electrode 707.

Figure 5B:
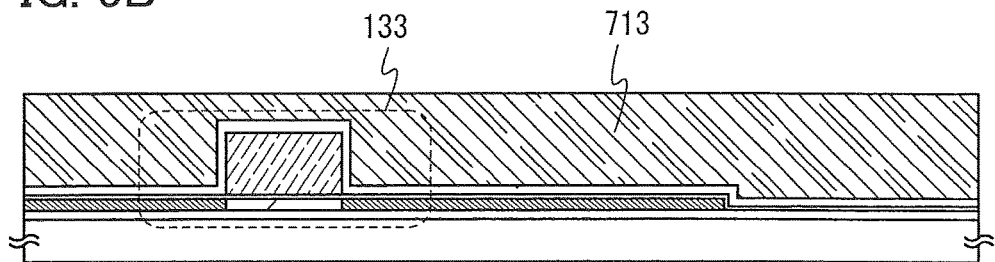

Next, as illustrated in FIG. 5B, the insulating film 713 is subjected to chemical mechanical polishing (CMP) or etching, so that a top surface of the insulating film 713 is planarized. Note that in order to improve the characteristics of the transistor 11 which is formed later, a surface of the insulating film 713 is preferably planarized as much as possible.

Through the above steps, the transistor 133 can be formed.

Figure 5C:
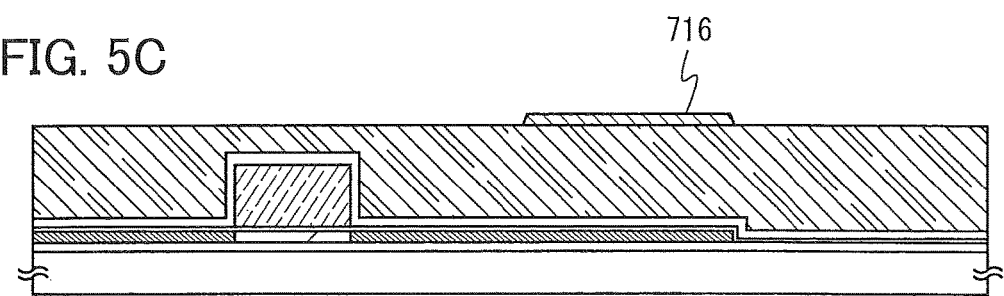

Next, a method for forming the transistor 11 is described. First, as illustrated in FIG. 5C, an oxide semiconductor layer 716 is formed over the insulating film 713.

The oxide semiconductor layer 716 preferably contains at least indium (In) or zinc (Zn). In particular, the oxide semiconductor layer 716 preferably contains In and Zn. As a stabilizer for reducing variations in electrical characteristics of a transistor including the oxide semiconductor layer, the oxide semiconductor layer preferably contains gallium (Ga) in addition to In and Zn. Tin (Sn) is preferably contained as a stabilizer. Hafnium (Hf) is preferably contained as a stabilizer. Aluminum (Al) is preferably contained as a stabilizer.

As another stabilizer, one or more kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

For example, indium oxide; tin oxide; zinc oxide; a binary metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a ternary metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; or a quaternary metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used as an oxide semiconductor.

Note that here, for example, an In—Ga—Zn-based oxide means an oxide containing In, Ga, and Zn as main components, and there is no limitation on the ratio of In, Ga, and Zn. In addition, the In—Ga—Zn—O-based oxide may contain a metal element other than In, Ga, and Zn.

A material represented by $InMO_3(ZnO)_m$ (m>0, where in is not an integer) may be used as the oxide semiconductor. Note that M denotes one or more metal elements selected from Ga, Fe, Mn, or Co. A material represented by $In_2SnO_5(ZnO)_n$ (n>0, where n is an integer) may be used as the oxide semiconductor.

For example, an In—Ga—Zn-based oxide with an atomic ratio of In:Ga:Zn=1:1:1 (=1/3:1/3:1/3) or In:Ga:Zn=2:2:1 (=2/5:2/5:1/5), or an oxide whose composition is in the neighborhood of the above composition can be used. Alternatively, an In—Sn—Zn-based oxide with an atomic ratio of In:Sn:Zn=1:1:1 (=1/3:1/3:1/3), In:Sn:Zn=2:1:3 (=1/3:1/6:1/2), or In:Sn:Zn=2:1:5 (=1/4:1/8:5/8), or an oxide whose composition is in the neighborhood of the above composition is preferably used.

However, without limitation to the materials given above, a material with an appropriate composition may be used depending on needed semiconductor characteristics (e.g., mobility, threshold voltage, and variations). In order to obtain needed semiconductor characteristics, it is preferable that carrier concentration, impurity concentration, defect density, an atomic ratio between a metal element and oxygen, interatomic distance, density, and the like be set to appropriate values.

For example, with an In—Sn—Zn-based oxide, high mobility can be comparatively easily obtained. However, even with an In—Ga—Zn-based oxide, mobility can be increased by lowering defect density in a bulk.

Note that for example, an expression "the composition of an oxide with an atomic ratio of In:Ga:Zn=a:b:c (a+b+c=1) is in the neighborhood of the composition of an oxide with an atomic ratio of In:Ga:Zn=A:B:C (A+B+C=1)" means that a, b, and c satisfy the following relation: $(a-A)^2+(b-B)^2+(c+C)^2 \le r^2$, and r may be 0.05, for example. The same applies to other oxides.

The oxide semiconductor may be either single crystal or non-single-crystal. In the latter case, the oxide semiconductor may be either amorphous or polycrystalline. Further, the oxide semiconductor may have either an amorphous structure including a crystalline portion or a non-amorphous structure.

An amorphous oxide semiconductor can have a flat surface comparatively easily, so that when a transistor is formed using the oxide semiconductor, interface scattering can be reduced, and comparatively high mobility can be obtained comparatively easily.

In a crystalline oxide semiconductor, defects in a bulk can be further reduced and when surface flatness is improved, mobility which is higher than or equal to the mobility of an amorphous oxide semiconductor can be obtained. In order to improve the surface flatness, the oxide semiconductor is preferably formed over a flat surface. Specifically, the oxide semiconductor may be formed over a surface with an average surface roughness Ra of less than or equal to 1 nm, preferably less than or equal to 0.3 nm, more preferably less than or equal to 0.1 nm.

Note that Ra is obtained by three-dimensionally expanding centerline average roughness, which is defined by JIS B0601, so as to be applicable to a surface. Further, Ra can be expressed as an average value of the absolute values of deviations from a reference surface to a specific surface and is defined by the following equation.

$$Ra = 1/S_0 \int_{y_1}^{y_2} \int_{x_1}^{x_2} |f(x,y) - Z_0| dx dy$$ [Equation 1]

In the equation, $S_0$ represents the area of a plane to be measured (a quadrangular region which is defined by four points represented by coordinates $(x_1, y_1)$, $(x_1, y_2)$, $(x_2, y_1)$, and $(x_2, y_2)$), and $Z_0$ represents the average height of the plane to be measured. Further, Ra can be measured using an atomic force microscope (AFM).

Note that it is preferable that impurities such as moisture or hydrogen which serve as electron donors (donors) be reduced in the oxide semiconductor layer 716. Specifically, the concentration of hydrogen in the oxide semiconductor layer 716 that is measured by secondary ion mass spectrometry (SIMS) is $5 \times 10^{19}/cm^3$ or lower, preferably $5 \times 10^{18}/cm^3$ or lower, more preferably $5 \times 10^{17}/cm^3$ or lower, still more preferably $1 \times 10^{16}/cm^3$ or lower.

The analysis of the concentration of hydrogen in the oxide semiconductor layer 716 is described here. The concentration of hydrogen in the oxide semiconductor layer is measured by secondary ion mass spectrometry. It is known that it is difficult to obtain precise data in the vicinity of a surface of a sample or in the vicinity of an interface between stacked layers formed using different materials by SIMS in principle. Thus, in the case where the distribution of the concentration of hydrogen in the layer in a thickness direction is analyzed by SIMS, an average value in a region of the layer in which the value is not greatly changed and is practically constant can be obtained is employed as the hydrogen concentration. In addition, in the case where the thickness of the layer is small, a region where a practically constant value can be obtained cannot be found in some cases due to the influence of the hydrogen concentration of the layers adjacent to each other. In that case, the maximum value or the minimum value of the hydrogen concentration in the region of the layer is employed as the hydrogen concentration of the layer. Further, in the case where a mountain-shaped peak having the maximum value or a valley-shaped peak having the minimum value do not exist in the region of the layer, the value at an inflection point is employed as the hydrogen concentration.

The oxide semiconductor layer 716 can be formed by processing an oxide semiconductor film formed over the insulating film 713 into a desired shape. The thickness of the oxide semiconductor film is 2 to 200 nm, preferably 3 to 50 nm, more preferably 3 to 20 nm. The oxide semiconductor film is formed by sputtering using an oxide semiconductor as a target. The oxide semiconductor film can be formed by sputtering in a rare gas (e.g., argon) atmosphere, an oxygen atmosphere, or a mixed atmosphere of a rare gas (e.g., argon) and oxygen.

In the case where the oxide semiconductor layer 716 is formed using an In—Sn—Zn—O-based material by sputtering, an oxide target with an atomic ratio of In:Sn:Zn=1:2:2, 2:1:3, 1:1:1, or 20:45:35, for example, can be used.

Here, it is important to reduce not only the concentration of hydrogen in the target but also water and hydrogen in a chamber as much as possible in the case where the oxide semiconductor layer 716 is formed by sputtering. Specifically, for example, it is effective to bake the inside of the chamber before formation of the oxide semiconductor layer 716, to reduce the concentrations of water and hydrogen in a gas introduced into the chamber, or to prevent counter flow in an exhaustion system for exhausting the gas from the chamber.

Before the oxide semiconductor film is formed by sputtering, dust on the surface of the insulating film 713 may be removed by reverse sputtering in which an argon gas is introduced and plasma is generated. The reverse sputtering is a method in which, without application of voltage to a target side, an RF power source is used for application of voltage to a substrate side in an argon atmosphere and plasma is generated in the vicinity of the substrate so that a substrate surface is modified. Note that nitrogen, helium, or the like may be used instead of the argon atmosphere. Alternatively, an argon atmosphere to which oxygen, nitrous oxide, or the like is added may be used. Alternatively, an argon atmosphere to which chlorine, carbon tetrafluoride, or the like is added may be used.

In order that hydrogen, a hydroxyl group, and moisture be contained in the oxide semiconductor film as little as possible, an impurity such as hydrogen or moisture that is adsorbed on the substrate 700 may be eliminated and exhausted by preheating of the substrate 700 over which the insulating films 712 and 713 are formed in a preheating chamber of a sputtering apparatus, as pretreatment for formation. The temperature of the preheating is 100 to 400° C., preferably 150 to 300° C. As an exhaustion means provided in the preheating chamber, a cryopump is preferable. Note that the preheating treatment can be omitted. This preheating may be similarly performed on the substrate 700 before the formation of an insulating film 717.

In this embodiment, a 30-nm-thick In—Ga—Zn—O-based oxide semiconductor thin film which is formed by sputtering using a target including indium (In), gallium (Ga), and zinc (Zn) is used as the oxide semiconductor film. A target with a composition ratio of metals, In:Ga:Zn=1:1:0.5, 1:1:1, or 1:1:2 can be used as the target, for example. The filling factor of the target including In, Ga, and Zn is higher than or equal to 90% and lower than or equal to 100%, preferably higher than or equal to 95% and lower than 100%. With the use of a target with a high filling factor, a dense oxide semiconductor film is formed.

In this embodiment, the oxide semiconductor film is formed in such a manner that the substrate is held in a treatment chamber kept at reduced pressure, moisture remaining in the treatment chamber is removed, a sputtering gas from which hydrogen and moisture are removed is introduced, and the target is used. The substrate temperature may be 100 to 600° C., preferably 200 to 400° C. during formation. By formation of the oxide semiconductor film while the substrate is heated, the concentration of impurities included in the oxide semiconductor film can be lowered. In addition, damage by sputtering can be reduced. In order to remove moisture remaining in the treatment chamber, an adsorption vacuum pump is preferably used. For example, a cryopump, an ion pump, or a titanium sublimation pump is preferably used. A turbo pump to which a cold trap is added may be used as an exhaustion means. For example, a hydrogen atom, a compound containing a hydrogen atom, such as water (preferably a compound containing a carbon atom), and the like are exhausted from the treatment chamber with the use of a cryopump. Thus, the concentration of impurities contained in the oxide semiconductor film formed in the treatment chamber can be lowered.

As an example of the formation condition, the following condition is employed: the distance between the substrate and the target is 100 mm, the pressure is 0.6 Pa, the direct current (DC) power is 0.5 kW, and the atmosphere is an oxygen atmosphere (the proportion of the oxygen flow rate is 100%). Note that it is preferable that pulsed direct-current (DC) power be used because dust generated during formation can be reduced and the film thickness can be uniform.

Further, when the leakage rate of the treatment chamber of the sputtering apparatus is set to $1 \times 10^{-10}$ Pa×m$^3$/s or lower, mixing of impurities such as alkali metal or hydride into the oxide semiconductor film that is being formed by sputtering can be reduced. Furthermore, with the use of the adsorption vacuum pump as an evacuation system, counter flow of impurities such as alkali metal, a hydrogen atom, a hydrogen molecule, water, a hydroxyl group, or hydride from the evacuation system can be reduced.

When the purity of the target is set to 99.99% or higher, alkali metal, a hydrogen atom, a hydrogen molecule, water, a hydroxyl group, hydride, or the like mixed into the oxide semiconductor film can be reduced. In addition, with the use of the target, the concentration of an alkali metal such as lithium, sodium, or potassium can be reduced in the oxide semiconductor film.

Note that it has been pointed out that an oxide semiconductor is insensitive to impurities, there is no problem when a considerable amount of metal impurities is contained in the film, and soda-lime glass which contains a large amount of alkali metal such as sodium (Na) and is inexpensive can be used (Kamiya, Nomura, and Hosono, "Carrier Transport Properties and Electronic Structures of Amorphous Oxide Semiconductors: The present status", *KOTAI BUTSURI (SOLID STATE PHYSICS)*, 2009, Vol. 44, pp. 621-633). But such consideration is not appropriate. Alkali metal is not an element included in an oxide semiconductor and thus is an impurity. Alkaline earth metal is also an impurity in the case where alkaline earth metal is not included in an oxide semiconductor. Alkali metal, in particular, Na becomes Na$^+$ when an insulating film which is in contact with an oxide semiconductor layer is an oxide and Na diffuses into the insulating film. In addition, in the oxide semiconductor layer, Na cuts or enters a bond between metal and oxygen which are included in an oxide semiconductor. As a result, for example, degradation in transistor characteristics, such as a normally on state of the transistor due to a shift in the threshold voltage in a negative direction, or a decrease in mobility, occurs. A variation in characteristics also occurs. Such degradation in transistor characteristics and a variation in characteristics due to the impurity are outstanding when the concentration of hydrogen in the oxide semiconductor layer is sufficiently low. Thus, when the concentration of hydrogen in the oxide semiconductor layer is $1 \times 10^{18}$/cm$^3$ or lower, preferably $1 \times 10^{17}$/cm$^3$ or lower, the concentration of the impurity is preferably lowered. Specifically, the measurement value of a Na concentration by secondary ion mass spectrometry is preferably $5 \times 10^{16}$/cm$^3$ or less, more preferably $1 \times 10^{16}$/cm$^3$ or less, still more preferably $1 \times 10^{15}$/cm$^3$ or less. Similarly, the measurement value of a Li concentration is preferably $5 \times 10^{15}$/cm$^3$ or less, more preferably $1 \times 10^{15}$/cm$^3$ or less. Similarly, the measurement value of a K concentration is preferably $5 \times 10^{15}$/cm$^3$ or less, more preferably $1 \times 10^{15}$/cm$^3$ or less.

An oxide semiconductor film can be single crystal, polycrystalline (also referred to as polycrystal), or amorphous, for example.

The oxide semiconductor film is preferably a c-axis aligned crystalline oxide semiconductor (CAAC-OS) film.

The CAAC-OS film is not completely single crystal nor completely amorphous.

The CAAC-OS film is an oxide semiconductor film with a crystal-amorphous mixed phase structure where crystal parts are included in an amorphous phase. Note that in most cases, the crystal part fits into a cube whose one side is less than 100 nm. From an observation image obtained with a transmission electron microscope (TEM), a boundary between the amorphous part and the crystal part in the CAAC-OS film is not clear. Further, with the TEM, a grain boundary in the CAAC-OS film is not found. Thus, in the CAAC-OS film, a reduction in electron mobility, due to the grain boundary, is suppressed.

In each of the crystal parts included in the CAAC-OS film, a c-axis is aligned in a direction parallel to a normal vector of a surface where the CAAC-OS film is formed or a normal vector of a surface of the CAAC-OS film, triangular or hexagonal atomic order which is seen from the direction perpendicular to the a-b plane is formed, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a simple term "perpendicular" includes a range of 85 to 95°. In addition, a simple term "parallel" includes a range of −5 to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the CAAC-OS film is higher than that in the vicinity of the surface where the CAAC-OS film is formed in some cases. Further, when an impurity is added to the CAAC-OS film, the crystal part in a region to which the impurity is added becomes amorphous in some cases.

Since the c-axes of the crystal parts in the CAAC-OS film are aligned in the direction parallel to the normal vector of the surface where the CAAC-OS film is formed or the normal vector of the surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that when the CAAC-OS film is formed, the c-axis direction of the crystal part is the direction parallel to the normal vector of the surface where the CAAC-OS film is formed or the normal vector of the surface of the CAAC-OS film. The crystal part is formed by deposition or by performing treatment for crystallization such as heat treatment after deposition.

With the use of the CAAC-OS film in a transistor, a change in electrical characteristics of the transistor due to irradiation with visible light or ultraviolet light can be reduced. Thus, the transistor has high reliability.

Note that part of oxygen included in the oxide semiconductor film may be substituted with nitrogen.

Examples of a crystal structure of the crystal part in the CAAC-OS film are described in detail with reference to FIGS. 7A to 7E, FIGS. 8A to 8C, and FIGS. 9A to 9C. Note that in FIGS. 7A to 7E, FIGS. 8A to 8C, and FIGS. 9A to 9C, the vertical direction corresponds to the c-axis direction and a plane perpendicular to the c-axis direction corresponds to the a-b plane, unless otherwise specified. When terms "upper half" and "lower half" are simply used, they refer to an upper half above the a-b plane and a lower half below the a-b plane (an upper half and a lower half with respect to the a-b plane). Further, in FIGS. 7A to 7E, an O atom surrounded by a circle represents a tetracoordinate O atom and an O atom surrounded by a double circle represents a tricoordinate O atom.

Figure 7A:
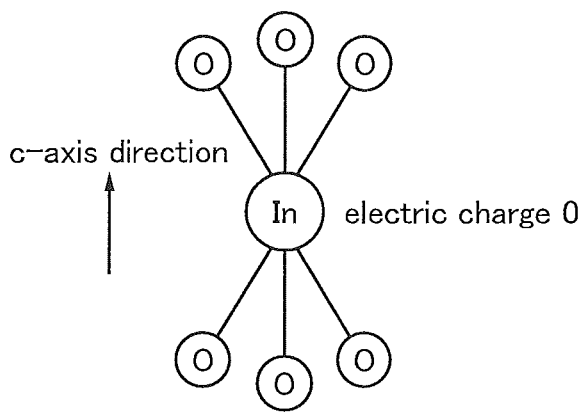
FIGS. 7A to 7E each illustrate the crystal structure of an oxide material.

FIG. 7A illustrates a structure including one hexacoordinate In atom and six tetracoordinate oxygen atoms (hereinafter referred to as tetracoordinate O atoms) close to the In atom. A structure in which one metal atom and oxygen atoms close to the metal atom are only illustrated is called a small group here. The structure in FIG. 7A is actually an octahedral structure, but is illustrated as a planar structure for simplicity. Note that three tetracoordinate O atoms exist in each of an upper half and a lower half in FIG. 7A. In the small group illustrated in FIG. 7A, electric charge is 0.

Figure 7D:
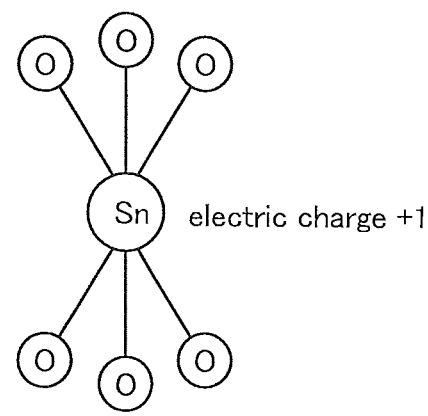
Figure 7B:
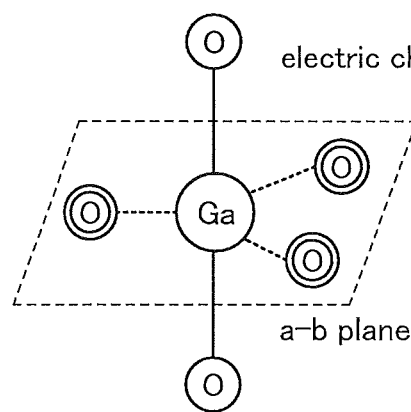

FIG. 7B illustrates a structure including one pentacoordinate Ga atom, three tricoordinate oxygen atoms (hereinafter referred to as tricoordinate O atoms) close to the Ga atom, and two tetracoordinate O atoms close to the Ga atom. All the tricoordinate O atoms exist in the a-b plane. One tetracoordinate O atom exists in each of an upper half and a lower half in FIG. 7B. An In atom can have the structure illustrated in FIG. 7B because the In atom can have five ligands. In a small group illustrated in FIG. 7B, electric charge is 0.

Figure 7E:
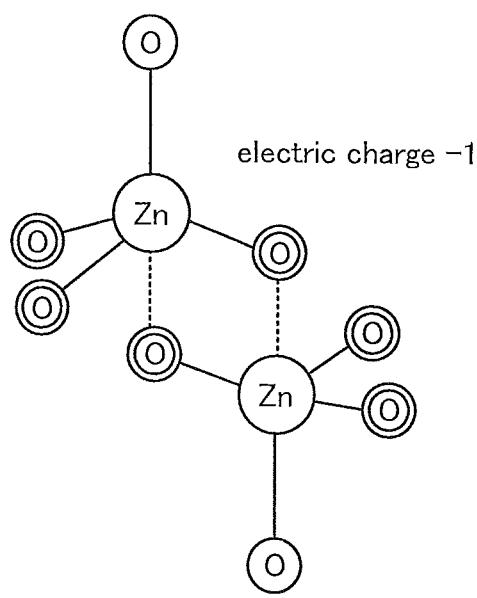
Figure 7C:
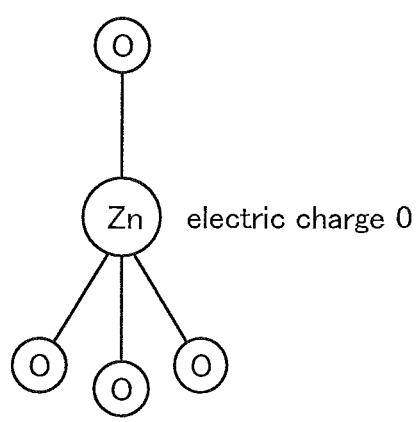

FIG. 7C illustrates a structure including one tetracoordinate Zn atom and four tetracoordinate O atoms close to the Zn atom. In FIG. 7C, one tetracoordinate O atom exists in an upper half and three tetracoordinate O atoms exists in a lower half. Alternatively, three tetracoordinate O atoms may exist in the upper half and one tetracoordinate O atom may exist in the lower half in FIG. 7C. In a small group illustrated in FIG. 7C, electric charge is 0.

FIG. 7D illustrates a structure including one hexacoordinate Sn atom and six tetracoordinate O atoms close to the Sn atom. In FIG. 7D, three tetracoordinate O atoms exists in each of an upper half and a lower half. In a small group illustrated in FIG. 7D, electric charge is +1.

FIG. 7E illustrates a small group including two Zn atoms. In FIG. 7E, one tetracoordinate O atom exists in each of an upper half and a lower half. In the small illustrated in FIG. 7E, electric charge is −1.

Here, a plurality of small groups form a medium group, and a plurality of medium groups form a large group (also referred to as a unit cell).

Here, a rule of bonding the small groups to each other is described. The three O atoms in the upper half with respect to the hexacoordinate In atom in FIG. 7A each have three proximity In atoms in the downward direction, and the three O atoms in the lower half each have three proximity In atoms in the upward direction. The one O atom in the upper half with respect to the pentacoordinate Ga atom in FIG. 7B has one proximity Ga atom in the downward direction, and the one O atom in the lower half has one proximity Ga atom in the upward direction. The one O atom in the upper half with respect to the tetracoordinate Zn atom in FIG. 7C has one proximity Zn atom in the downward direction, and the three O atoms in the lower half each have three proximity Zn atoms in the upward direction. In this manner, the number of the tetracoordinate O atoms above the metal atom is equal to the number of the proximity metal atoms below the tetracoordinate O atoms. Similarly, the number of the tetracoordinate O atoms below the metal atom is equal to the number of the proximity metal atoms above the tetracoordinate O atoms. Since the coordination number of the O atom is 4, the sum of the number of the proximity metal atoms below the O atom and the number of the proximity metal atoms above the O atom is 4. Accordingly, when the sum of the number of the tetracoordinate O atoms above the metal atom and the number of the tetracoordinate O atoms below another metal atom is 4, the two kinds of small groups including the metal atoms can be bonded to each other. For example, in the case where a hexacoordinate metal (In or Sn) atom is bonded through three tetracoordinate O atoms in the upper half, the hexacoordinate metal atom is bonded to a pentacoordinate metal (Ga or In) atom or a tetracoordinate metal (Zn) atom.

A metal atom having the above coordination number is bonded to another metal atom through a tetracoordinate O atom in the c-axis direction. Further, a plurality of small groups are bonded to each other so that the total electric charge in a layer structure is 0. Thus, a medium group is constituted.

Figure 8A:
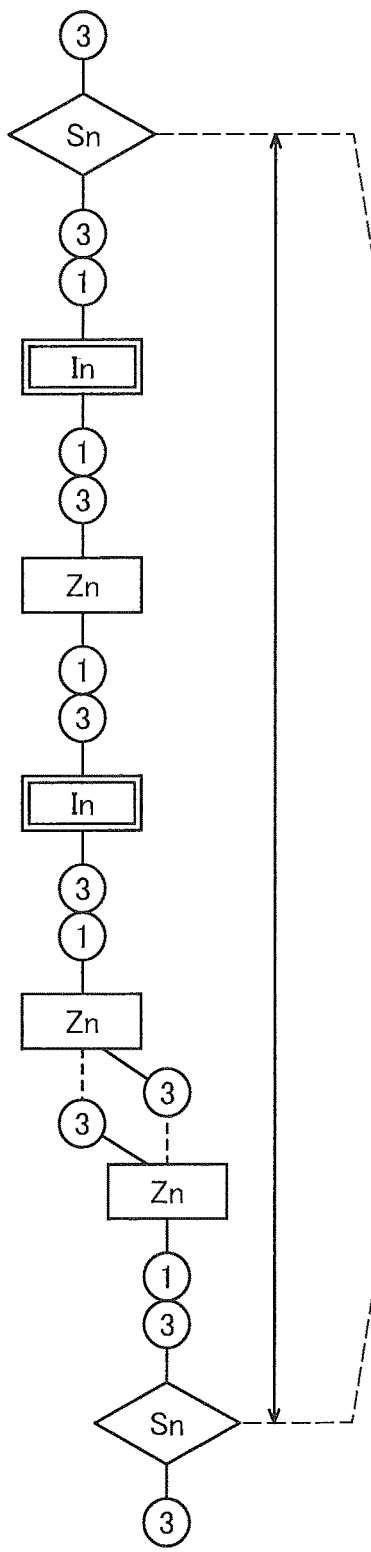
FIGS. 8A to 8C illustrate the crystal structure of an oxide material.
Figure 8B:
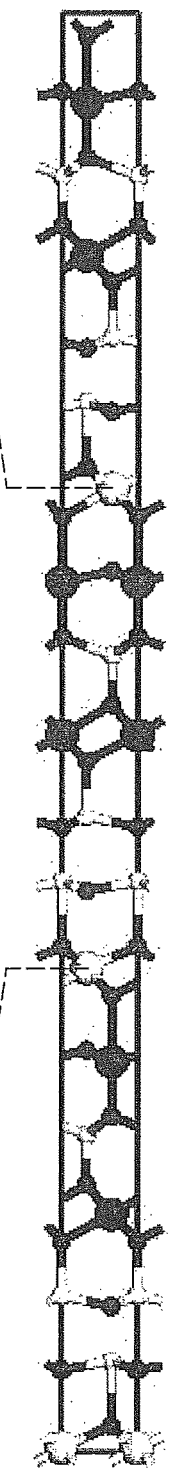
Figure 8C:
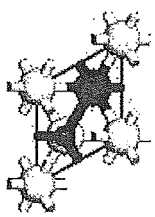

FIG. 8A illustrates a model of a medium group included in a layer structure of an In—Sn—Zn—O-based material. FIG. 8B illustrates a large group including three medium groups. Note that FIG. 8C illustrates atomic order in the case of the layer structure in FIG. 8B observed from the c-axis direction.

In FIG. 8A, for simplicity, a tricoordinate O atom is not illustrated and a tetracoordinate O atom is illustrated by a circle; the number in the circle shows the number of tetracoordinate O atoms. For example, three tetracoordinate O atoms existing in each of an upper half and a lower half with respect to a Sn atom are denoted by circled 3. Similarly, in FIG. 8A, one tetracoordinate O atom existing in each of an upper half and a lower half with respect to an In atom is denoted by circled 1. FIG. 8A also illustrates a Zn atom close to one tetracoordinate O atom in a lower half and three tetracoordinate O atoms in an upper half, and a Zn atom close to one tetracoordinate O atom in an upper half and three tetracoordinate O atoms in a lower half.

In the medium group included in the layer structure of the In—Sn—Zn—O-based material in FIG. 8A, in the order starting from the top, a Sn atom close to three tetracoordinate O atoms in each of an upper half and a lower half is bonded to an In atom close to one tetracoordinate O atom in each of an upper half and a lower half, the In atom is bonded to a Zn atom close to three tetracoordinate O atoms in an upper half, the Zn atom is bonded to an In atom close to three tetracoordinate O atoms in each of an upper half and a lower half through one tetracoordinate O atom in a lower half with respect to the Zn atom, the In atom is bonded to a small group that includes two Zn atoms and is close to one tetracoordinate O atom in an upper half, and the small group is bonded to a Sn atom close to three tetracoordinate O atoms in each of an upper half and a lower half through one tetracoordinate O atom in a lower half with respect to the small group. A plurality of such medium groups are bonded to each other so that a large group is constituted.

Here, electric charge for one bond of a tricoordinate O atom and electric charge for one bond of a tetracoordinate O atom can be assumed to be −0.667 and −0.5, respectively. For example, electric charge of a hexacoordinate or pentacoordinate In atom, electric charge of a tetracoordinate Zn atom, and electric charge of a pentacoordinate or hexacoordinate Sn atom are +3, +2, and +4, respectively. Thus, electric charge of a small group including a Sn atom is +1. Consequently, an electric charge of −1, which cancels an electric charge of +1, is needed to form a layer structure including a Sn atom. As a structure having an electric charge of −1, the small group including two Zn atoms as illustrated in FIG. 7E can be given. For example, when one small group including two Zn atoms is provided for one small group including a Sn atom, electric charge is canceled, so that the total electric charge in the layer structure can be 0.

Specifically, when a large group illustrated in FIG. 8B is formed, an In—Sn—Zn—O-based crystal ($In_2SnZn_3O_8$) can be obtained. Note that the layer structure of the In—Sn—Zn—O-based crystal can be expressed as a composition formula, $In_2SnZn_2O_7(ZnO)_m$ (m is 0 or a natural number).

The above rule also applies to the following oxides: a quaternary metal oxide such as an In—Sn—Ga—Zn—O-based oxide; a ternary metal oxide such as an In—Ga—Zn—O-based oxide (also referred to as IGZO), an In—Al—Zn—O-based oxide, a Sn—Ga—Zn—O-based oxide, an Al—Ga—Zn—O-based oxide, a Sn—Al—Zn—O-based oxide, an In—Hf—Zn—O-based oxide, an In—La—Zn—O-based oxide, an In—Ce—Zn—O-based oxide, an In—Pr—Zn—O-based oxide, an In—Nd—Zn—O-based oxide, an In—Sm—Zn—O-based oxide, an In—Eu—Zn—O-based oxide, an In—Gd—Zn—O-based oxide, an In—Tb—Zn—O-based oxide, an In—Dy—Zn—O-based oxide, an In—Ho—Zn—O-based oxide, an In—Er—Zn—O-based oxide, an In—Tm—Zn—O-based oxide, an In—Yb—Zn—O-based oxide, or an In—Lu—Zn—O-based oxide; a binary metal oxide such as an In—Zn—O-based oxide, a Sn—Zn—O-based oxide, an Al—Zn—O-based oxide, a Zn—Mg—O-based oxide, a Sn—Mg—O-based oxide, an In—Mg—O-based oxide, or an In—Ga—O-based oxide; a unary metal oxide such as a In—O-based oxide, a Sn—O-based oxide, or a Zn—O-based oxide; and the like.

Figure 9A:
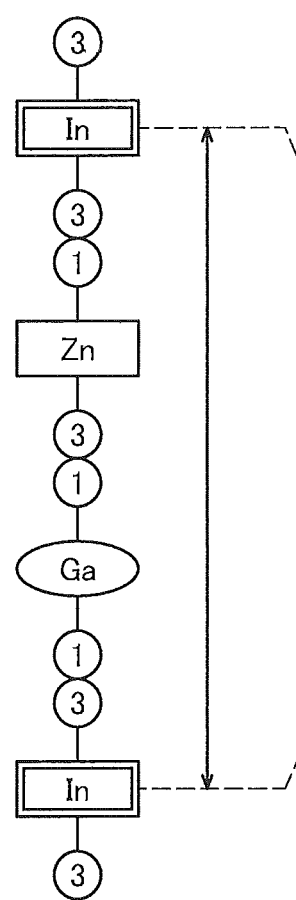
FIGS. 9A to 9C illustrate the crystal structure of an oxide material.

For example, FIG. 9A illustrates a model of a medium group included in a layer structure of an In—Ga—Zn—O-based material.

In the medium group included in the layer structure of the In—Ga—Zn—O-based material in FIG. 9A, in the order starting from the top, an In atom close to three tetracoordinate O atoms in each of an upper half and a lower half is bonded to a Zn atom close to one tetracoordinate O atom in an upper half, the Zn atom is bonded to a Ga atom close to one tetracoordinate O atom in each of an upper half and a lower half through three tetracoordinate O atoms in a lower half with respect to the Zn atom, and the Ga atom is bonded to an In atom close to three tetracoordinate O atoms in each of an upper half and a lower half through one tetracoordinate O atom in a lower half with respect to the Ga atom. A plurality of such medium groups are bonded to each other so that a large group is constituted.

Figure 9B:
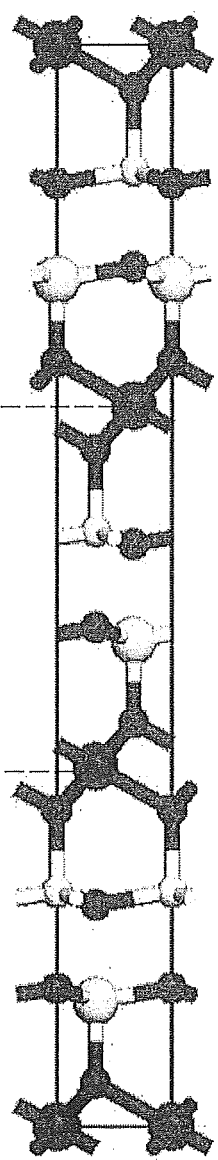
Figure 9C:
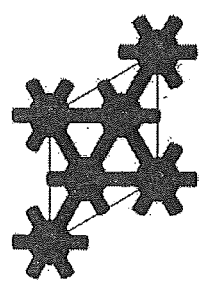

FIG. 9B illustrates a large group including three medium groups. Note that FIG. 9C illustrates atomic order in the case of the layer structure in FIG. 9B observed from the c-axis direction.

Here, since electric charge of a hexacoordinate or pentacoordinate In atom, electric charge of a tetracoordinate Zn atom, and electric charge of a pentacoordinate Ga atom are +3, +2, and +3, respectively, electric charge of a small group including any of an In atom, a Zn atom, and a Ga atom is 0. Thus, the total electric charge of a medium group having a combination of such small groups is always 0.

In order to form the layer structure of the In—Ga—Zn—O-based material, a large group can be formed using not only the medium group illustrated in FIG. 9A but also a medium group in which arrangement of an In atom, a Ga atom, and a Zn atom is different from that in FIG. 9A.

Specifically, when a large group illustrated in FIG. 9B is formed, an In—Ga—Zn—O-based crystal can be obtained. Note that the layer structure of the In—Ga—Zn—O-based crystal can be expressed as a composition formula, $In_2GaO_3(ZnO)_n$ (n is a natural number).

Figure 10A:
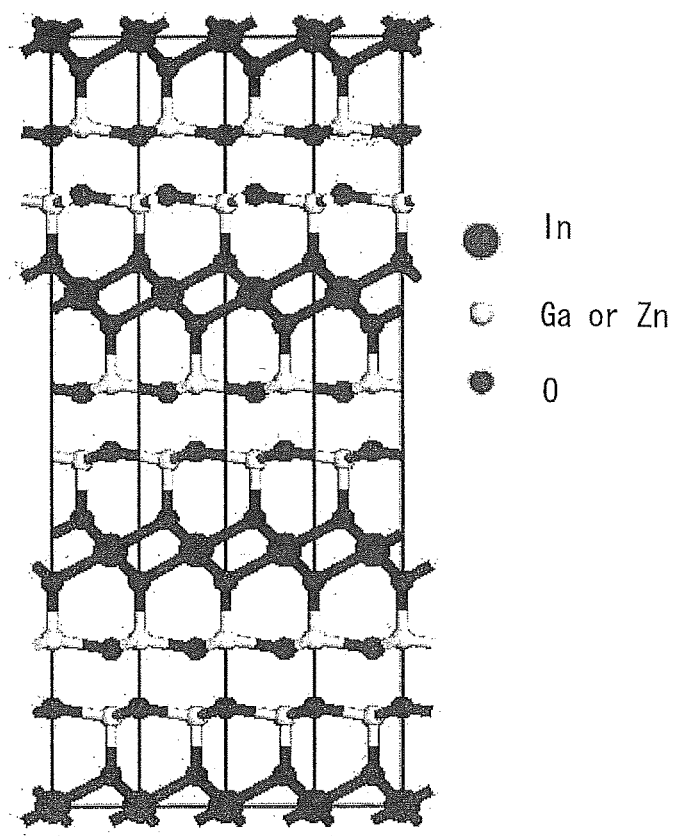
FIGS. 10A and 10B each illustrate the crystal structure of an oxide material.

In the case where n=1 ($InGaZnO_4$), a crystal structure illustrated in FIG. 10A can be obtained, for example. Note that in the crystal structure illustrated in FIG. 10A, since a Ga atom and an In atom each have five ligands as described in FIG. 7B, a structure in which a Ga atom is replaced with an In atom can be obtained.

Figure 10B:
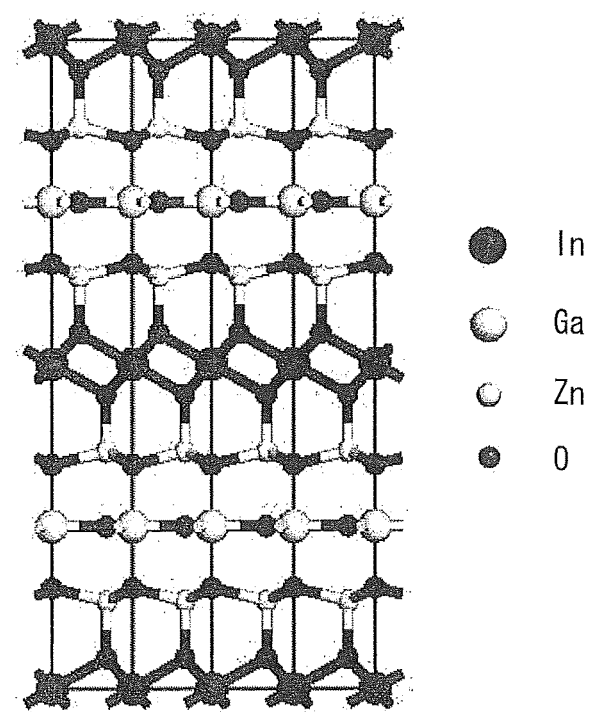

In the case where n=2 ($InGaZn_2O_5$), a crystal structure illustrated in FIG. 10B can be obtained, for example. Note that in the crystal structure illustrated in FIG. 10B, since a Ga atom and an In atom each have five ligands as described in FIG. 7B, a structure in which a Ga atom is replaced with an In atom can be obtained.

A CAAC-OS film can be formed by sputtering. The above material can be used as a target material. In the case where the CAAC-OS film is formed by sputtering, the proportion of an oxygen gas in an atmosphere is preferably high. In the case where sputtering is performed in a mixed gas atmosphere of argon and oxygen, for example, the proportion of an oxygen gas is preferably 30% or higher, more preferably 40% or higher because supply of oxygen from the atmosphere promotes crystallization of the CAAC-OS film.

In the case where the CAAC-OS film is formed by sputtering, a substrate over which the CAAC-OS film is formed is heated to preferably 150° C. or higher, more preferably 170° C. or higher. This is because the higher the substrate temperature becomes, the more crystallization of the CAAC-OS film is promoted.

After heat treatment is performed on the CAAC-OS film in a nitrogen atmosphere or in vacuum, heat treatment is preferably performed in an oxygen atmosphere or a mixed atmosphere of oxygen and another gas. This is because oxygen vacancy due to the former heat treatment can be filled by supply of oxygen from the atmosphere in the latter heat treatment.

A film surface on which the CAAC-OS film is formed (a deposition surface) is preferably flat. This is because the c-axis approximately perpendicular to the deposition surface exists in the CAAC-OS film, so that deposition surface irregularities induce generation of grain boundaries in the CAAC-OS film. Thus, planarization treatment such as chemical mechanical polishing (CMP) is preferably performed on the deposition surface before the CAAC-OS film is formed. The average roughness of the deposition surface is preferably 0.5 nm or less, more preferably 0.3 nm or less.

Note that an oxide semiconductor film formed by sputtering or the like contains moisture or hydrogen (including a hydroxyl group) as an impurity in some cases. In one embodiment of the present invention, in order to reduce impurities such as moisture or hydrogen in the oxide semiconductor film (in order to perform dehydration or dehydrogenation), heat treatment is performed on the oxide semiconductor film in a reduced-pressure atmosphere, an inert gas atmosphere of nitrogen, a rare gas, or the like, an oxygen gas atmosphere, or ultra dry air (the moisture amount is 20 ppm (−55° C. by conversion into a dew point) or less, preferably 1 ppm or less, more preferably 10 ppb or less, in the case where measurement is performed by a dew point meter in a cavity ring-down laser spectroscopy (CRDS) method).

By performing heat treatment on the oxide semiconductor film, moisture or hydrogen in the oxide semiconductor film can be eliminated. Specifically, heat treatment may be performed at a temperature higher than or equal to 250° C. and lower than or equal to 750° C., preferably higher than or equal to 400° C. and lower than the strain point of the substrate. For example, heat treatment may be performed at 500° C. for 3 to 6 minutes. When RTA is used for the heat treatment, dehydration or dehydrogenation can be performed in a short time; thus, treatment can be performed even at a temperature higher than the strain point of a glass substrate.

In this embodiment, an electric furnace that is one of heat treatment apparatuses is used.

Note that the heat treatment apparatus is not limited to an electric furnace, and may be provided with a device for heating an object by thermal conduction or thermal radiation from a heater such as a resistance heater. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus with which heat treatment is performed using a high-temperature gas. An inert gas which does not react with an object by heat treatment, such as nitrogen or a rare gas (e.g., argon), is used as the gas.

In the heat treatment, it is preferable that moisture, hydrogen, and the like be not contained in nitrogen or a rare gas such as helium, neon, or argon. Alternatively, the purity of nitrogen or a rare gas such as helium, neon, or argon which is introduced into the heat treatment apparatus is preferably 6N (99.9999%) or higher, more preferably 7N (99.99999%) or higher (that is, the impurity concentration is 1 ppm or lower, preferably 0.1 ppm or lower).

Through the step, the concentration of hydrogen in the oxide semiconductor film can be lowered.

After moisture or hydrogen in the oxide semiconductor film is eliminated in this manner, oxygen is added (supplied) to the oxide semiconductor film (or an oxide semiconductor layer formed using the oxide semiconductor film). Thus, oxygen defects, for example, in the oxide semiconductor film (the oxide semiconductor layer) or at an interface of the oxide semiconductor film (the oxide semiconductor layer) can be reduced, so that the oxide semiconductor layer can be intrinsic or substantially intrinsic.

Oxygen can be added in such a manner, for example, that an insulating film including a region where the proportion of oxygen is higher than the stoichiometric proportion is formed in contact with the oxide semiconductor film (or the oxide semiconductor layer formed using the oxide semiconductor film), and then heat treatment is performed. In this manner, excess oxygen in the insulating film can be supplied to the oxide semiconductor film (the oxide semiconductor layer). Thus, the oxide semiconductor film (the oxide semiconductor layer) can contain oxygen excessively. Oxygen contained excessively exists, for example, between lattices of a crystal included in the oxide semiconductor film (the oxide semiconductor layer).

Note that the insulating film including a region where the proportion of oxygen is higher than the stoichiometric proportion may be applied to either the insulating film placed on an upper side of the oxide semiconductor film (the oxide semiconductor layer) or the insulating film placed on a lower side of the oxide semiconductor film (the oxide semiconductor layer) of the insulating films which are in contact with the oxide semiconductor film (the oxide semiconductor layer); however, it is preferable to apply such an insulating film to both the insulating films which are in contact with the oxide semiconductor film (the oxide semiconductor layer). The above effect can be enhanced with a structure where the oxide semiconductor film (the oxide semiconductor layer) is provided between the insulating films each including a region where the proportion of oxygen is higher than the stoichiometric proportion, which are used as the insulating films in contact with the oxide semiconductor film (the oxide semiconductor layer) and positioned on the upper side and the lower side of the oxide semiconductor film (the oxide semiconductor layer).

Here, the insulating film including a region where the proportion of oxygen is higher than the stoichiometric proportion may be a single-layer insulating film or a plurality of insulating films stacked. Note that the insulating film preferably includes impurities such as moisture or hydrogen as little as possible. When hydrogen is contained in the insulating film, hydrogen enters the oxide semiconductor film (the oxide semiconductor layer) or oxygen in the oxide semiconductor film (the oxide semiconductor layer) is extracted by hydrogen, whereby the oxide semiconductor film has lower resistance (n-type conductivity); thus, a parasitic channel might be formed. Thus, it is important that a formation method in which hydrogen is not used be employed in order to form the insulating film containing hydrogen as little as possible. A material having a high barrier property is preferably used for the insulating film. As the insulating film having a high barrier property, a silicon nitride film, a silicon nitride oxide film, an aluminum nitride film, an aluminum oxide film, an aluminum nitride oxide film, or the like can be used, for example. When a plurality of insulating films stacked are used, an insulating film having a low proportion of nitrogen, such as a silicon oxide film or a silicon oxynitride film, is formed on a side which is closer to the oxide semiconductor film (the oxide semiconductor layer) than the insulating film having a high barrier property. Then, the insulating film having a high barrier property is formed to overlap with the oxide semiconductor film (the oxide semiconductor layer) with the insulating film having a low proportion of nitrogen sandwiched therebetween. When the insulating film having a high barrier property is used, impurities such as moisture or hydrogen can be prevented from entering the oxide semiconductor film (the oxide semiconductor layer) or the interface between the oxide semiconductor film (the oxide semiconductor layer) and another insulating film and the vicinity thereof. In addition, the insulating film having a low proportion of nitrogen, such as a silicon oxide film or a silicon oxynitride film, is formed to be in contact with the oxide semiconductor film (the oxide semiconductor layer), so that the insulating film having a high barrier property can be prevented from being in direct contact with the oxide semiconductor film (the oxide semiconductor layer).

Alternatively, addition of oxygen after moisture or hydrogen in the oxide semiconductor film (the oxide semiconductor layer) is eliminated may be performed by performing heat treatment on the oxide semiconductor film (the oxide semiconductor layer) in an oxygen atmosphere. It is preferable that an oxygen gas used for the heat treatment in an oxygen atmosphere do not include water, hydrogen, or the like. Alternatively, the purity of the oxygen gas which is introduced into a heat treatment apparatus is preferably 6N (99.9999%) or higher, more preferably 7N (99.99999%) or higher (that is, the impurity concentration in oxygen is 1 ppm or lower, preferably 0.1 ppm or lower).

Alternatively, addition of oxygen after moisture or hydrogen in the oxide semiconductor film (the oxide semiconductor layer) is eliminated may be performed by ion implantation, ion doping, or the like. For example, oxygen made to be plasma with a microwave of 2.45 GHz may be added to the oxide semiconductor film (the oxide semiconductor layer).

The thus formed oxide semiconductor film is etched so that the oxide semiconductor layer 716 is formed. Alternatively, the oxide semiconductor layer 716 is formed using the thus formed oxide semiconductor layer.

Figure 5D:
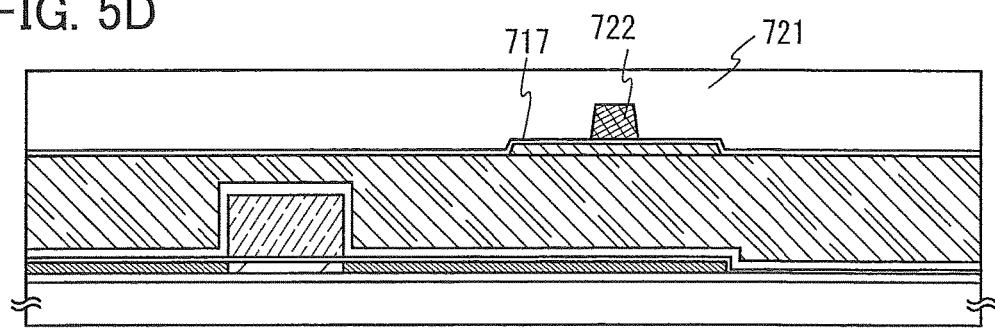

Next, as illustrated in FIG. 5D, the insulating film 717 is formed over the oxide semiconductor layer 716. Note that the insulating film 717 may be used as the insulating film including a region where the proportion of oxygen is higher than the stoichiometric proportion. Then, over the insulating film 717, a gate electrode 722 is formed to overlap with the oxide semiconductor layer 716. After that, an insulating film 721 is formed over the gate electrode 722.

The gate electrode 722 can be formed in such a manner that a conductive film is formed over the insulating film 717 and then is etched. The gate electrode 722 can be formed using a material which is similar to the material of the gate electrode 707.

The thickness of the gate electrode 722 is 10 to 400 nm, preferably 100 to 200 nm. In this embodiment, after a 150-m-n-thick conductive film for the gate electrode is formed by sputtering using a tungsten target, the conductive film is processed into a desired shape by etching, so that the gate electrode 722 is formed. A resist mask may be formed by an inkjet method. When the resist mask is formed by an inkjet method, a photomask is not used; thus, manufacturing cost can be reduced.

Figure 6A:
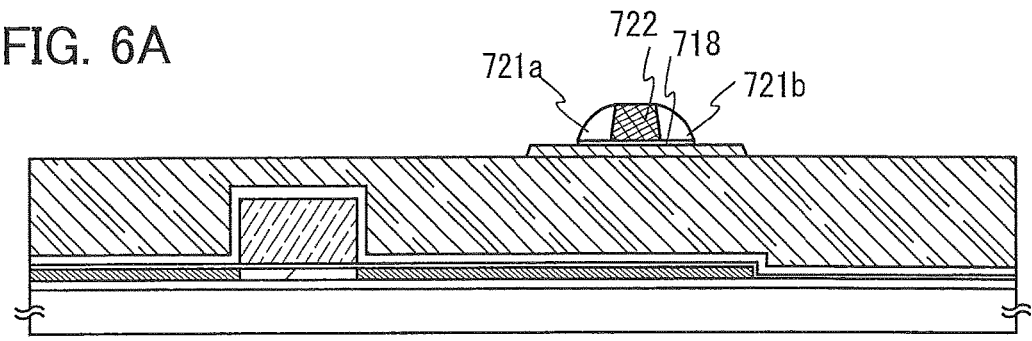
FIGS. 6A to 6D illustrate steps of forming a signal processing circuit.

Then, as illustrated in FIG. 6A, insulators 721a and 721b which are provided on side surfaces of the gate electrode 722 and function as side walls, and an insulating layer 718 which remains in a portion overlapping with the gate electrode 722 and the insulators 721a and insulator 721b and functions as a gate insulating film are formed by anisotropic etching performed in a direction perpendicular to a surface of the substrate 700.

Figure 6B:
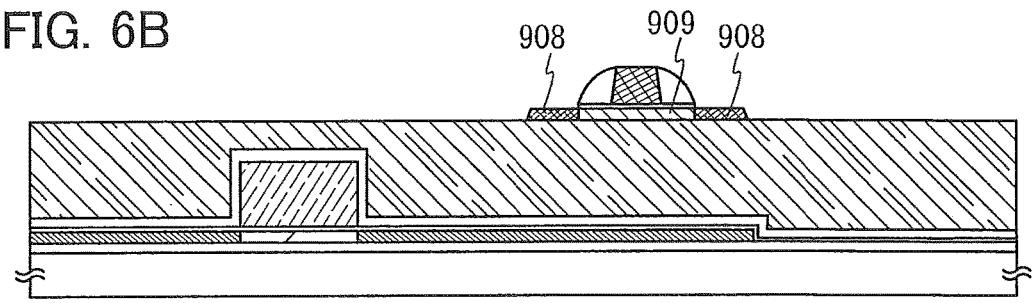

Then, as illustrated in FIG. 6B, a pair of high-concentration regions 908 and a region 909 formed between the pair of high-concentration regions 908 are formed by addition of a dopant imparting n-type conductivity to the oxide semiconductor layer 716 with the use of the gate electrode 722 and the insulators 721a and 721b as masks. Note that in the region 909, a region which overlaps with the gate electrode 722 with the insulating layer 718 provided therebetween is a channel formation region. The dopant used for forming the high-concentration regions 908 can be added by ion implantation. A rare gas such as helium, argon, or xenon; a Group 15 atom such as nitrogen, phosphorus, arsenic, or antimony; or the like can be used as the dopant, for example. For example, in the case where nitrogen is used as the dopant, the concentration of nitrogen atoms in the high-concentration region 908 is preferably $5 \times 10^{19}/cm^3$ or higher and $1 \times 10^{22}/cm^3$ or lower. The high-concentration region 908 to which the dopant imparting n-type conductivity is added has higher conductivity than other regions in the oxide semiconductor layer 716.

Note that although FIG. 6B illustrates the case where a dopant imparting conductivity is not added to a region of the oxide semiconductor layer 716 that overlaps with the insulators 721a and 721b, this embodiment is not limited thereto. After the gate electrode 722 is formed in FIG. 5D, an impurity region may be formed in the region of the oxide semiconductor layer 716 that overlaps with the insulators 721a and 721b by addition of a dopant imparting conductivity. Alternatively, a dopant imparting conductivity may be added (first addition) after the gate electrode 722 is fixated in FIG. 5D, and a dopant imparting conductivity may be added (second addition) after the insulators 721a and 721b are formed in FIG. 6B so that a low-concentration region is formed in the region overlapping with the insulators 721a and 721b. The low-concentration region has a lower concentration of an impurity element imparting conductivity than the high-concentration region 908.

Figure 6C:
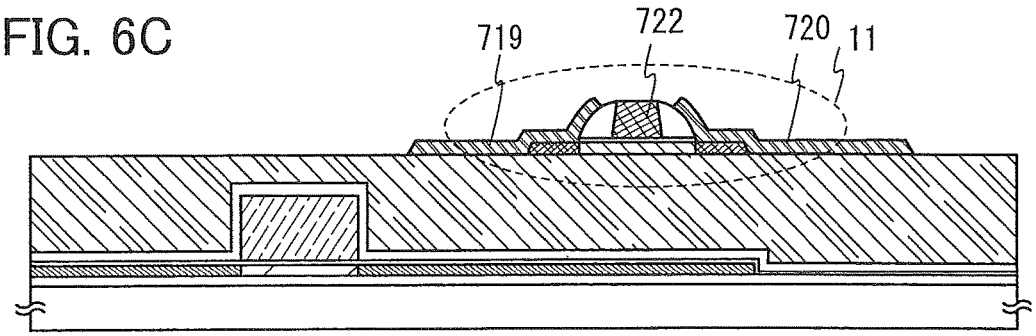

Next, as illustrated in FIG. 6C, conductive layers 719 and 720 which are in contact with the high-concentration regions 908 are formed. The conductive layers 719 and 720 function as a source and drain electrodes.

Specifically, the conductive layers 719 and 720 can be formed in such a manner that a conductive film is formed by sputtering or vacuum vapor deposition and then is processed into a predetermined shape.

As the conductive film which serves as the conductive layers 719 and 720, any of the following materials can be used: an element selected from aluminum, chromium, copper, tantalum, titanium, molybdenum, or tungsten; an alloy including the above element; an alloy film including the above elements in combination; and the like. Alternatively, a structure may be employed in which a film of a refractory metal such as chromium, tantalum, titanium, molybdenum, or tungsten is stacked over or below a metal film of aluminum, copper, or the like. Aluminum or copper is preferably used in combination with a refractory metal material in order to avoid problems with heat resistance and corrosion. As the refractory metal material, molybdenum, titanium, chromium, tantalum, tungsten, neodymium, scandium, yttrium, or the like can be used.

Further, the conductive film which serves as the conductive layers 719 and 720 may have either a single-layer structure or a layered structure of two or more layers. For example, a single-layer structure of an aluminum film containing silicon, a two-layer structure in which a titanium film is stacked over an aluminum film, a three-layer structure in which a titanium film, an aluminum film, and a titanium film are stacked in that order, and the like can be given. A Cu—Mg—Al alloy, a Mo—Ti alloy, Ti, and Mo have high adhesion with an oxide film. Thus, when the conductive layers 719 and 720 are formed using a stack in which a conductive film including a Cu—Mg—Al alloy, a Mo—Ti alloy, Ti, or Mo is used for a lower layer and a conductive film including Cu is used for an upper layer, the adhesion between the insulating film 713, the insulators 721a and 721b, and the conductive layers 719 and 720 can be increased.

For the conductive film which serves as the conductive layers 719 and 720, a conductive metal oxide may be used. As the conductive metal oxide, indium oxide, tin oxide, zinc oxide, indium oxide-tin oxide, indium oxide-zinc oxide, or the metal oxide material containing silicon or silicon oxide can be used.

In the case where heat treatment is performed after the formation of the conductive film, the conductive film preferably has heat resistance high enough to withstand the heat treatment.

In this embodiment, a titanium film is used as the conductive film. Thus, the conductive film can be selectively etched by wet etching using a solution (an ammonia hydrogen peroxide mixture) containing ammonia and hydrogen peroxide water. Specifically, an ammonia hydrogen peroxide mixture in which oxygenated water of 31 wt %, ammonia water of 28 wt %, and water are mixed at a volume ratio of 5:2:2 is used. Alternatively, dry etching may be performed on the conductive film with the use of a gas containing chlorine ($Cl_2$), boron chloride ($BCl_3$), or the like.

Note that in order to reduce the number of photomasks used in a photolithography process and to reduce the number of processes, etching may be performed using a multi-tone mask through which light is transmitted to have a plurality of intensities. A resist mask formed using a multi-tone mask has a plurality of thicknesses and can be changed in shape by etching; thus, the resist mask can be used in a plurality of etching processes for processing films into different patterns. Accordingly, a resist mask corresponding to at least two or more kinds of different patterns can be formed by one multi-tone mask. Thus, the number of exposure masks and the number of corresponding photolithography processes can be reduced, so that the process can be simplified.

In this manner, the transistor 11 is formed. The transistor 11 has the high-concentration regions 908, so that resistance between the source and drain electrodes (the conductive layers 719 and 720) can be lowered.

When the resistance between the source and drain electrodes (the conductive layers 719 and 720) is lowered, high on-state current and high-speed operation can be secured even when the transistor 11 is miniaturized.

In the case where an In—Ga—Zn—O-based oxide semiconductor is used for the oxide semiconductor layer 716, an oxide semiconductor in the high-concentration region 908 has a wurtzite crystal structure by heat treatment at 300 to 600° C. for 1 hour after the addition of nitrogen. When the oxide semiconductor in the high-concentration region 908 has a wurtzite crystal structure, the conductivity of the high-concentration region 908 can be further increased and the resistance between the source and drain electrodes (the conductive layers 719 and 720) can be further lowered. Note that in order to effectively lower the resistance between the source and drain electrodes (the conductive layers 719 and 720) by formation of an oxide semiconductor with a wurtzite crystal structure, the concentration of nitrogen atoms in the high-concentration region 908 is preferably $1\times10^{20}/cm^3$ or higher and 7 at. % or lower in the case where nitrogen is used as the dopant. Even in the case where the concentration of nitrogen atoms is lower than the above range, an oxide semiconductor with a wurtzite crystal structure can be obtained in some cases.

Further, an oxide conductive film functioning as a source and drain regions may be provided between the high-concentration regions 908 and the conductive layers 719 and 720 functioning as a source and drain electrodes. The material of the oxide conductive film preferably contains zinc oxide as a component and preferably does not contain indium oxide. For such an oxide conductive film, zinc oxide, zinc aluminum oxide, zinc aluminum oxynitride, gallium zinc oxide, or the like can be used.

For example, in the case where the oxide conductive film is formed, etching for forming the oxide conductive film and etching for forming the conductive layers 719 and 720 may be performed simultaneously.

With provision of the oxide conductive film functioning as a source and drain regions, resistance between the high-concentration regions 908 and the conductive layers 719 and 720 can be lowered, so that the transistor 11 can operate at high speed. In addition, with provision of the oxide conductive film functioning as a source and drain regions, the withstand voltage of the transistor 11 can be increased.

In the transistor 11, the source and drain electrodes (the conductive layers 719 and 720) do not overlap with the gate electrode 722. In other words, a gap which is larger than the thickness of the insulating layer 718 is provided between the source and drain electrodes (the conductive layers 719 and 720) and the gate electrode 722. Thus, in the transistor 11, parasitic capacitance formed between the source and drain electrodes and the gate electrode can be reduced. Consequently, high-speed operation can be performed.

Note that the transistor 11 is not limited to a transistor whose channel is formed in an oxide semiconductor layer, and it is possible to use a transistor that includes a semiconductor material whose bandgap is wider than that of silicon and whose intrinsic carrier density is lower than that of silicon in a channel formation region. As such a semiconductor material, for example, silicon carbide, gallium nitride, or the like can be used instead of an oxide semiconductor. With a channel formation region including such a semiconductor material, a transistor whose off-state current is extremely low can be obtained.

Although the transistor 11 is a single-gate transistor, a multi-gate transistor including a plurality of channel formation regions can be formed when a plurality of gate electrodes electrically connected to each other are included as necessary.

Note that an insulating film which is in contact with the oxide semiconductor layer 716 (in this embodiment, corresponding to the insulating layer 718) may be formed using an insulating material containing a Group 13 element and oxygen. Many oxide semiconductor materials contain Group 13 elements, and an insulating material containing a Group 13 element works well with an oxide semiconductor. By using such an insulating material containing a Group 13 element for the insulating film which is in contact with the oxide semiconductor layer, the state of an interface with the oxide semiconductor layer can be kept well.

An insulating material containing a Group 13 element is an insulating material containing one or more Group 13 elements. Examples of the insulating material containing a Group 13 element include gallium oxide, aluminum oxide, aluminum gallium oxide, and gallium aluminum oxide. Here, aluminum gallium oxide is a material whose content of aluminum is larger than the content of gallium in an atomic percent, and gallium aluminum oxide is a material whose content of gallium is larger than or equal to the content of aluminum in an atomic percent.

For example, in the case where an insulating film is formed in contact with an oxide semiconductor layer containing gallium, when a material containing gallium oxide is used for the insulating film, favorable characteristics can be kept at the interface between the oxide semiconductor layer and the insulating film. For example, when the oxide semiconductor layer and the insulating film containing gallium oxide are provided in contact with each other, pile up of hydrogen at the interface between the oxide semiconductor layer and the insulating film can be reduced. Note that a similar effect can be obtained in the case where an element that belongs to the same group as a constituent element of the oxide semiconductor is used for the insulating film. For example, it is effective to form an insulating film with the use of a material containing aluminum oxide. Aluminum oxide does not easily transmit water. Thus, it is preferable to use the material including aluminum oxide in order to prevent water from entering the oxide semiconductor layer.

The insulating film which is in contact with the oxide semiconductor layer 716 preferably contains oxygen in a proportion higher than the stoichiometric proportion by heat treatment in an oxygen atmosphere or oxygen doping. Oxygen doping is addition of oxygen to a bulk. Note that the term "bulk" is used in order to clarify that oxygen is added not only to a surface of a thin film but also to the inside of the thin film. The term "oxygen doping" also means "oxygen plasma doping" in which oxygen which is made to be plasma is added to a bulk. The oxygen doping may be performed by ion implantation or ion doping.

For example, in the case where the insulating film which is in contact with the oxide semiconductor layer 716 is formed using gallium oxide, the composition of gallium oxide can be $Ga_2O_x$ ($X=3+\alpha$, $0<\alpha<1$) by heat treatment in an oxygen atmosphere or oxygen doping.

In the case where the insulating film which is in contact with the oxide semiconductor layer 716 is formed using aluminum oxide, the composition of aluminum oxide can be $Al_2O_X$ ($X=3+\alpha$, $0<\alpha<1$) by heat treatment in an oxygen atmosphere or oxygen doping.

In the case where the insulating film which is in contact with the oxide semiconductor layer 716 is formed using gallium aluminum oxide (aluminum gallium oxide), the composition of gallium aluminum oxide (aluminum gallium oxide) can be $Ga_XAl_{2-X}O_{3+a}$ ($0<X<2$, $0<a<1$) by heat treatment in an oxygen atmosphere or oxygen doping.

By oxygen doping, an insulating film including a region where the proportion of oxygen is higher than the stoichiometric proportion can be formed. When the insulating film including such a region is in contact with the oxide semiconductor layer, oxygen that exists excessively in the insulating film is supplied to the oxide semiconductor layer, and oxygen defects in the oxide semiconductor layer or at the interface between the oxide semiconductor layer and the insulating film are reduced. Thus, the oxide semiconductor layer can be an intrinsic or substantially intrinsic oxide semiconductor.

The insulating film including a region where the proportion of oxygen is higher than the stoichiometric proportion may be applied to either the insulating film placed on an upper side of the oxide semiconductor layer or the insulating film placed on a lower side of the oxide semiconductor layer of the insulating films which are in contact with the oxide semiconductor layer 716; however, it is preferable to apply such an insulating film to both the insulating films. The above effect can be enhanced with a structure where the oxide semiconductor layer 716 is sandwiched between the insulating films each including a region where the proportion of oxygen is higher than the stoichiometric proportion, which are used as the insulating films in contact with the oxide semiconductor layer 716 and positioned on the upper side and the lower side of the oxide semiconductor layer 716.

The insulating films on the upper side and the lower side of the oxide semiconductor layer 716 may contain the same constituent element or different constituent elements. For example, the insulating films on the upper side and the lower side may be both formed using gallium oxide whose composition is $Ga_2O_X$ ($X=3+\alpha$, $0<\alpha<1$). Alternatively, one of the insulating films on the upper side and the lower side may be formed using $Ga_2O_X$ ($X=3+\alpha$, $0<\alpha<1$) and the other may be formed using aluminum oxide whose composition is $Al_2O_X$ ($X=3+\alpha$, $0<\alpha<1$).

The insulating film which is in contact with the oxide semiconductor layer 716 may be formed by a stack of insulating films each including a region where the proportion of oxygen is higher than the stoichiometric proportion. For example, the insulating film on the upper side of the oxide semiconductor layer 716 may be formed as follows: gallium oxide whose composition is $Ga_2O_X$ ($X=3+\alpha$, $0<\alpha<1$) is formed and gallium aluminum oxide (aluminum gallium oxide) whose composition is $Ga_XAl_{2-X}O_{3+\alpha}$ ($0<X<2$, $0<\alpha<1$) may be formed thereover. Note that the insulating film on the lower side of the oxide semiconductor layer 716 may be formed by a stack of insulating films each including a region where the proportion of oxygen is higher than the stoichiometric proportion. Alternatively, both the insulating films on the upper side and the lower side of the oxide semiconductor layer 716 may be formed by a stack of insulating films each including a region where the proportion of oxygen is higher than the stoichiometric proportion.

Figure 6D:
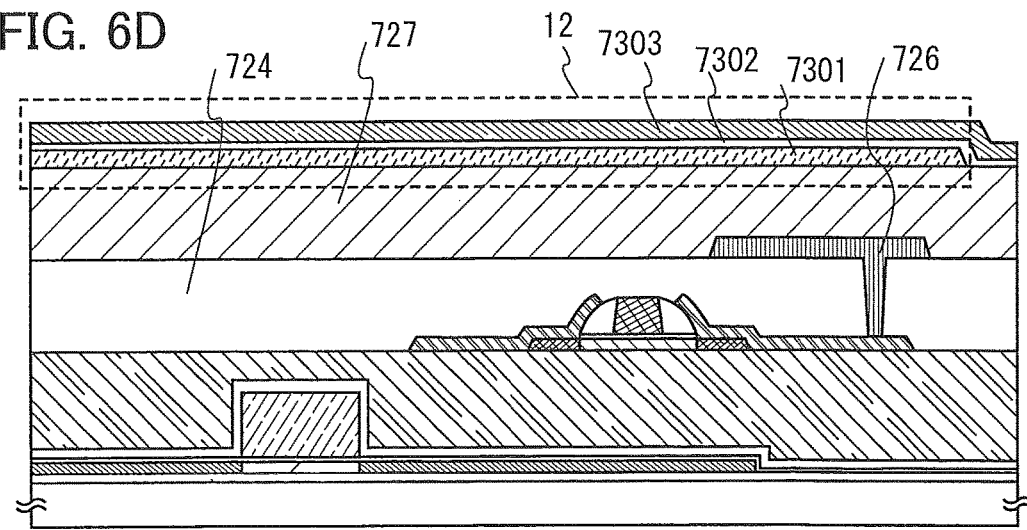

Next, as illustrated in FIG. 6D, an insulating film 724 is formed. The insulating film 724 can be formed by PVD, CVD, or the like. The insulating film 724 can be formed using a material including an inorganic insulating material such as silicon oxide, silicon oxynitride, silicon nitride, hafnium oxide, gallium oxide, or aluminum oxide. Note that for the insulating film 724, a material with a low dielectric constant or a structure with a low dielectric constant (e.g., a porous structure) is preferably used. When the dielectric constant of the insulating film 724 is lowered, parasitic capacitance generated between wirings or electrodes can be reduced, which results in higher speed operation. Although the insulating film 724 has a single-layer structure in this embodiment, one embodiment of the present invention is not limited to this structure. The insulating film 724 may have a layered structure of two or more layers.

Next, an opening is formed in the insulating film 724, so that part of the conductive layer 720 is exposed. After that, a wiring 726 which is in contact with the conductive layer 720 through the opening is formed over the insulating film 724.

A conductive film is formed by PVD or CVD and then is etched so that the wiring 726 is formed. As the material of the conductive film, an element selected from aluminum, chromium, copper, tantalum, titanium, molybdenum, or tungsten; an alloy containing the above element as a component; or the like can be used. A material including one of manganese, magnesium, zirconium, beryllium, neodymium, and scandium or a combination of any of these elements may be used.

Specifically, for example, it is possible to employ a method in which a thin titanium film (with a thickness of approximately 5 nm) is formed in a region including the opening in the insulating film 724 by PVD, and then an aluminum film is formed to be embedded in the opening. Here, the titanium film formed by PVD has a function of reducing an oxide film (e.g., a natural oxide film) formed on a surface over which the titanium film is formed, to decrease the contact resistance with the lower electrode or the like (here, the conductive layer 720). In addition, hillocks of the aluminum film can be prevented. A copper film may be formed by a plating method after a barrier film of titanium, titanium nitride, or the like is formed.

Next, an insulating film 727 is formed to cover the wiring 726. Further, a conductive film is formed over the insulating film 727 and is etched so that a conductive layer 7301 is formed. Then, an insulating film 7302 is formed to cover the conductive layer 7301, and a conductive film 7303 is formed over the insulating film 7302. Thus, the capacitor 12 can be formed. One of the pair of electrodes of the capacitor 12 corresponds to the conductive layer 7301. The other of the pair of electrodes of the capacitor 12 corresponds to the conductive film 7303. A dielectric layer of the capacitor 12 corresponds to the insulating film 7302. Here, the materials of the insulating film 727, the conductive layer 7301, the insulating film 7302, and the conductive film 7303 can be similar to the materials of other insulating films and other conductive layers.

Through the series of steps, the signal processing circuit 111 can be formed.

This embodiment can be combined with any of the other embodiments as appropriate.

Embodiment 4

In this embodiment, characteristics of a transistor whose channel is formed in an oxide semiconductor layer are described.

A transistor whose channel is formed in an oxide semiconductor layer containing In, Sn, and Zn as main components can have favorable characteristics by forming an oxide semiconductor film serving as the oxide semiconductor layer while heating a substrate or by performing heat treatment after the oxide semiconductor film is formed. Note that a main component is an element contained in a composition at 5 atomic percent or more.

By intentionally heating the substrate after formation of the oxide semiconductor film containing In, Sn, and Zn as main components, the field-effect mobility of the transistor can be improved. Further, the threshold voltage of the transistor can be positively shifted to make the transistor normally off.

Figure 11A:
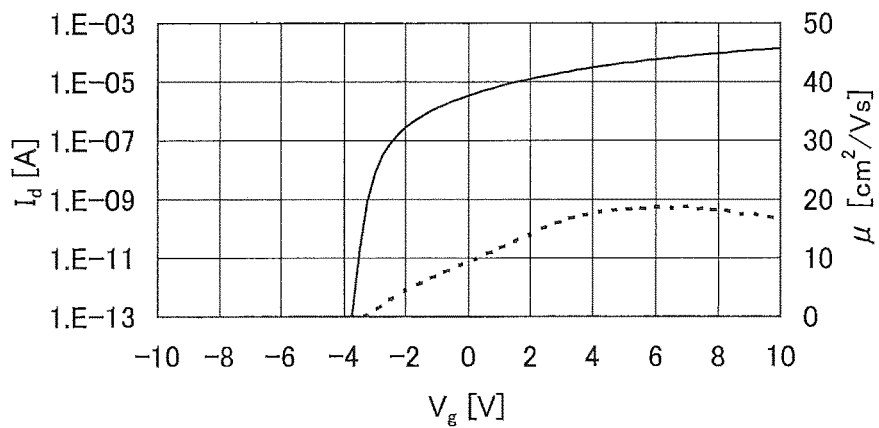
FIGS. 11A to 11C are graphs each showing characteristics of a transistor whose channel is formed in an oxide semiconductor layer.
Figure 11B:
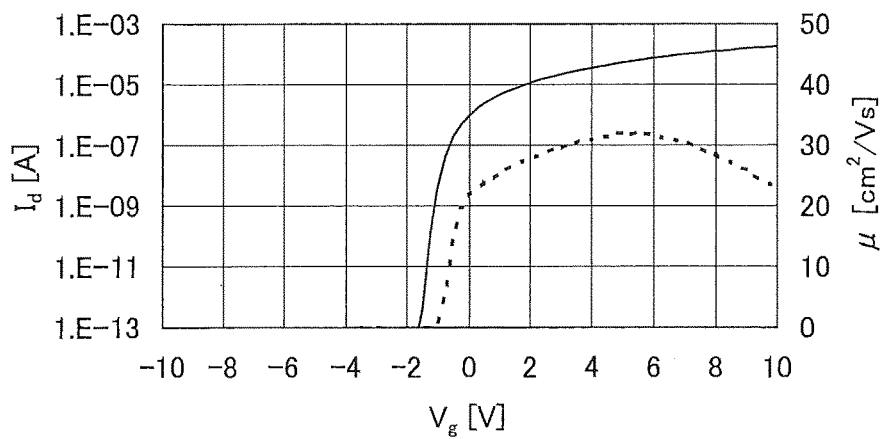
Figure 11C:
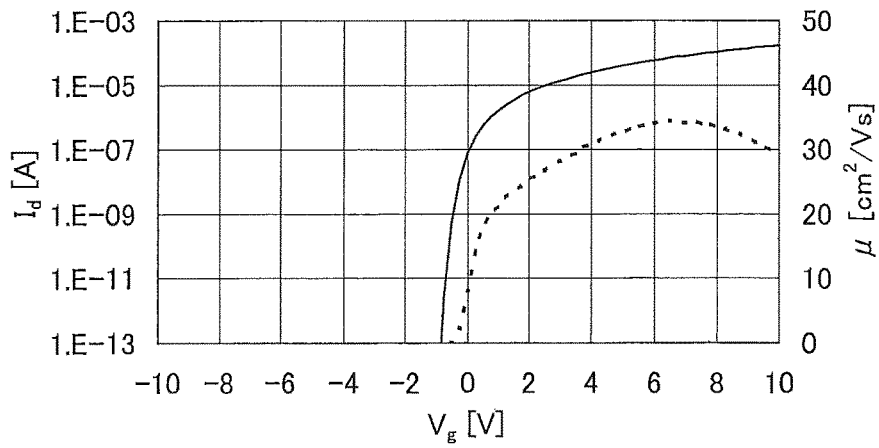

As an example, FIGS. 11A to 11C are graphs each showing characteristics of a transistor in which an oxide semiconductor film containing In, Sn, and Zn as main components and having a channel length L of 3 μm and a channel width W of 10 μm and a 100-nm-thick gate insulating film are used. Note that Vd was set to 10 V.

FIG. 11A shows characteristics of a transistor whose oxide semiconductor film containing In, Sn, and Zn as main components is formed by sputtering without heating a substrate intentionally. The field-effect mobility of the transistor was 18.8 $cm^2/Vs$. On the other hand, when the oxide semiconductor film containing In, Sn, and Zn as main components is formed while heating the substrate intentionally, the field-effect mobility can be improved. FIG. 11B shows characteristics of a transistor whose oxide semiconductor film containing In, Sn, and Zn as main components is formed while heating a substrate at 200° C. The field-effect mobility of the transistor was 32.2 $cm^2/V \cdot s$.

The field-effect mobility can be further improved by performing heat treatment after formation of the oxide semiconductor film containing In, Sn, and Zn as main components. FIG. 11C shows characteristics of a transistor whose oxide semiconductor film containing In, Sn, and Zn as main components is formed by sputtering at 200° C. and then subjected to heat treatment at 650° C. The field-effect mobility of the transistor was 34.5 $cm^2/V \cdot s$.

The intentional heating of the substrate can reduce moisture taken into the oxide semiconductor film during deposition by sputtering. In addition, the heat treatment after deposition can release and remove hydrogen, a hydroxyl group, or moisture from the oxide semiconductor film. In this manner, the field-effect mobility can be improved. Such an improvement in field-effect mobility is presumed to be achieved not only by removal of impurities by dehydration or dehydrogenation but also by a reduction in interatomic distance due to an increase in density. Further, an oxide semiconductor can be crystallized by being highly purified by removal of impurities from the oxide semiconductor. Such a highly purified non-single-crystal oxide semiconductor can ideally have a field-effect mobility of higher than 100 $cm^2/V \cdot s$.

An oxide semiconductor containing In, Sn, and Zn as main components may be crystallized in such a manner that oxygen ions are implanted into the oxide semiconductor, hydrogen, a hydroxyl group, or moisture included in the oxide semiconductor is released by heat treatment, and the oxide semiconductor is crystallized through the heat treatment or by another heat treatment performed later. A non-single-crystal oxide semiconductor having high crystallinity can be obtained by such crystallization or recrystallization.

The intentional heating of the substrate during the deposition and/or the heat treatment after the deposition contributes not only to an improvement in field-effect mobility but also to making the transistor normally off. In a transistor in which an oxide semiconductor film which contains In, Sn, and Zn as main components and is formed without heating a substrate intentionally is used as a channel formation region, the threshold voltage tends to be shifted negatively. However, when the oxide semiconductor film formed while heating the substrate intentionally is used, the problem of a negative shift in the threshold voltage can be solved. In other words, the threshold voltage is shifted so that the transistor becomes normally off, and this tendency can be confirmed by comparison between FIGS. 11A and 11B.

Note that the threshold voltage can also be controlled by changing the ratio of In, Sn, and Zn. When the composition ratio of In, Sn, and Zn is 2:1:3, the transistor can be normally off. In addition, an oxide semiconductor film having high crystallinity can be obtained by setting the composition ratio of a target as follows: In:Sn:Zn=2:1:3.

The temperature of the intentional heating of the substrate or the temperature of the heat treatment is 150° C. or higher, preferably 200° C. or higher, more preferably 400° C. or higher. When deposition or heat treatment is performed at a higher temperature, the transistor can be normally off.

By intentionally heating the substrate during the deposition and/or by performing heat treatment after the deposition, stability against gate-bias stress can be increased. For example, when gate-bias stress is applied with an intensity of 2 MV/cm at 150° C. for one hour, drift of the threshold voltage can be less than ±1.5 V, preferably less than ±1.0 V.

A BT test was performed on the following two transistors: Sample 1 on which heat treatment was not performed after formation of an oxide semiconductor film, and Sample 2 on which heat treatment was performed at 650° C. after formation of an oxide semiconductor film.

First, $V_g$-$I_d$ characteristics of the transistors were measured at a substrate temperature of 25° C. and $V_d$ of 10 V. Note that $V_d$ is drain voltage (a potential difference between a drain and a source). Then, the substrate temperature was set to 150° C. and $V_d$ was set to 0.1 V. After that, $V_g$ of 20 V was applied so that the intensity of an electric field applied to a gate insulating film was 2 MV/cm, and the condition was kept for one hour. Next, $V_g$ was set to 0 V. Then, $V_g$-$I_d$ characteristics of the transistors were measured at a substrate temperature of 25° C. and $V_d$ of 10 V. This process is called a positive BT test.

In a similar manner, first, $V_g$-$I_d$ characteristics of the transistors were measured at a substrate temperature of 25° C. and $V_d$ of 10 V. Then, the substrate temperature was set to 150° C. and $V_d$ was set to 0.1 V. After that, $V_g$ of −20 V was applied so that the intensity of an electric field applied to a gate insulating film was −2 MV/cm, and the condition was kept for one hour. Next, $V_g$ was set to 0 V. Then, $V_g$-$I_d$ characteristics of the transistors were measured at a substrate temperature of 25° C. and $V_d$ of 10 V. This process is called a negative BT test.

Figure 12A:
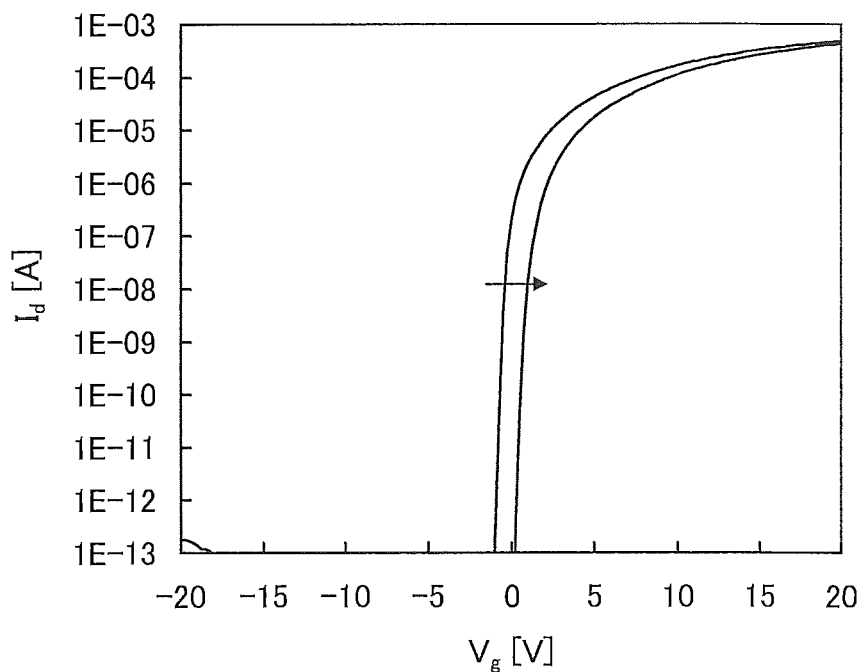
FIGS. 12A and 12B are graphs each showing $V_g$-$I_d$ characteristics of a transistor of Sample 1 which has been subjected to a BT test.
Figure 12B:
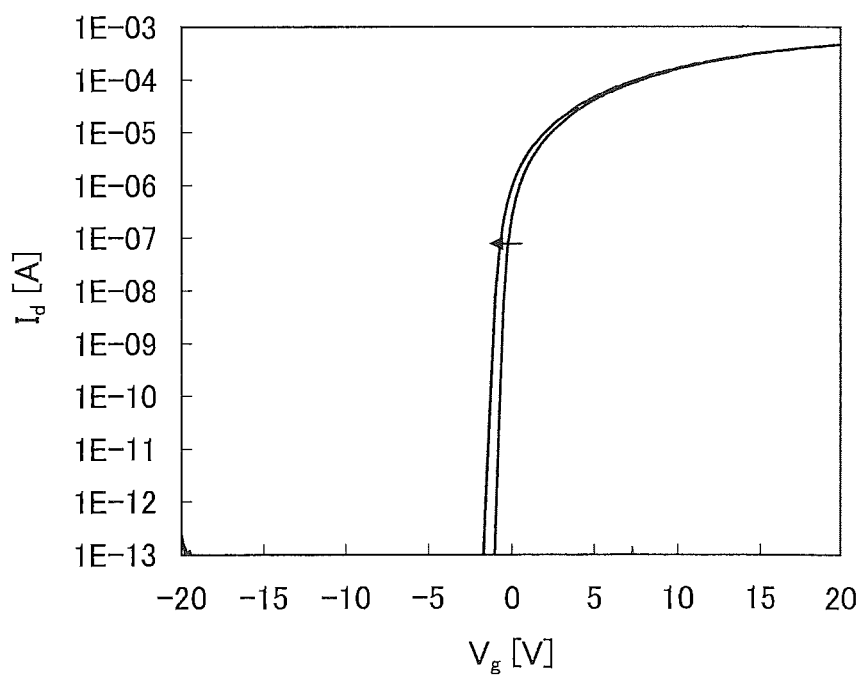
Figure 13A:
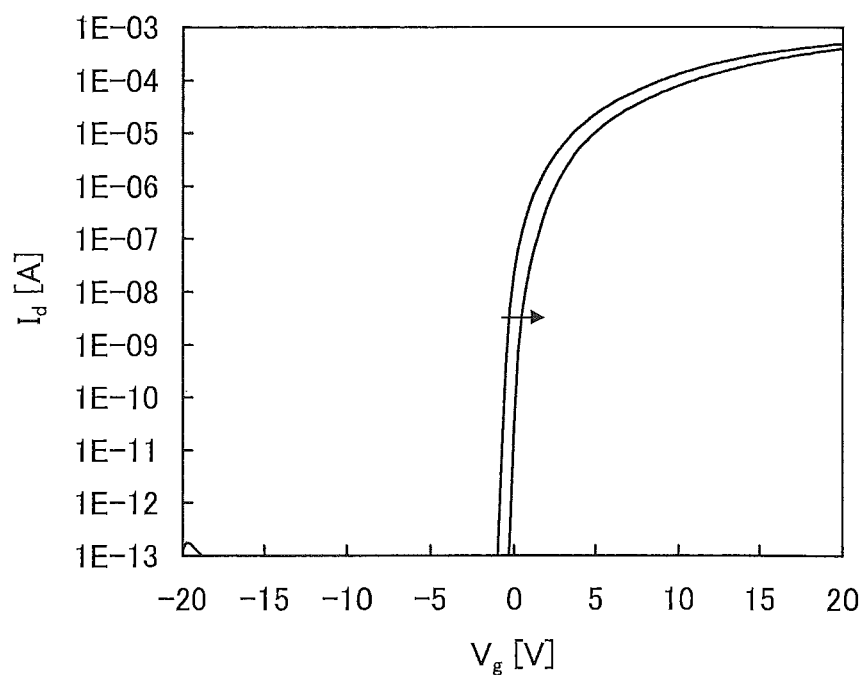
FIGS. 13A and 13B are graphs each showing $V_g$-$I_d$ characteristics of a transistor of Sample 2 which has been subjected to a BT test.
Figure 13B:
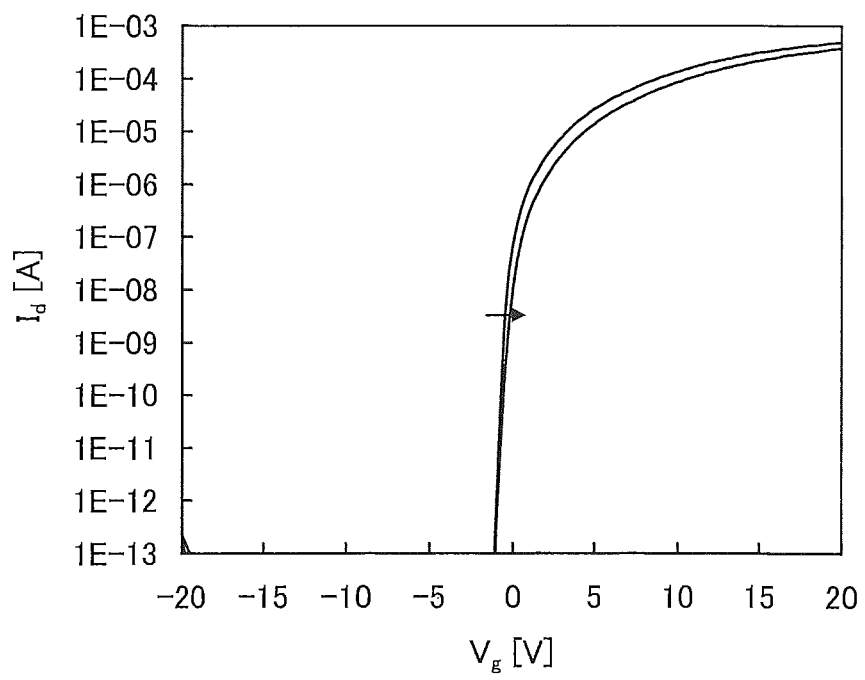

FIGS. 12A and 12B show results of the positive BT test and the negative BT test of Sample 1. FIGS. 13A and 13B show results of the positive BT test and the negative BT test of Sample 2.

The amount of changes in threshold voltage of Sample 1 in the positive BT test and the amount of changes in threshold voltage of Sample 1 in the negative BT test were 1.80 V and −0.42 V, respectively. The amount of changes in threshold voltage of Sample 2 in the positive BT test and the amount of changes in threshold voltage of Sample 2 in the negative BT test were 0.79 V and 0.76 V, respectively. These results show that in each of Sample 1 and Sample 2, the amount of changes in threshold voltage in the BT tests is small and the reliability of each transistor is high.

The heat treatment can be performed in an oxygen atmosphere; alternatively, the heat treatment may be performed in an atmosphere of nitrogen or an inert gas or under reduced pressure, and then may be performed in an atmosphere including oxygen. When oxygen is supplied to the oxide semiconductor after dehydration or dehydrogenation, the effect of the heat treatment can be enhanced. As a method for supplying oxygen after dehydration or dehydrogenation, a method in which oxygen ions are accelerated by an electric field and implanted into the oxide semiconductor film may be employed.

A defect due to oxygen vacancy is easily generated in the oxide semiconductor or at an interface between the oxide semiconductor and a film which is in contact with the oxide semiconductor; however, when excess oxygen is included in the oxide semiconductor by the heat treatment, oxygen vacancy generated constantly can be filled with excess oxygen. The excess oxygen is mainly oxygen existing between lattices. When the concentration of oxygen is set in the range of $1\times10^{16}$ to $2\times10^{20}$/cm$^3$, excess oxygen can be included in the oxide semiconductor without causing crystal distortion or the like.

When heat treatment is performed so that at least part of the oxide semiconductor includes crystal, a stabler oxide semiconductor film can be obtained. For example, when an oxide semiconductor film which is formed by sputtering using a target having a composition ratio of In:Sn:Zn=1:1:1 without heating a substrate intentionally is analyzed by X-ray diffraction (XRD), a halo pattern is observed. The oxide semiconductor film can be crystallized by being subjected to heat treatment. The temperature of the heat treatment can be set as appropriate. When the heat treatment is performed at 650° C., for example, a clear diffraction peak can be observed with X-ray diffraction.

XRD analysis of an In—Sn—Zn—O film was performed. The XRD analysis was performed using an X-ray diffractometer D8 ADVANCE manufactured by Bruker AXS, and measurement was performed by an out-of-plane method.

Sample A and Sample B were prepared and XRD analysis of these samples was performed. A method for forming Sample A and Sample B is described below.

A 100-nm-thick In—Sn—Zn—O film was formed over a quartz substrate that had been subjected to dehydrogenation treatment.

The In—Sn—Zn—O film was formed using a sputtering apparatus with a power of 100 W (DC) in an oxygen atmosphere. An In—Sn—Zn—O target having an atomic ratio of In:Sn:Zn=1:1:1 was used as a target. Note that the substrate heating temperature during deposition was set to 200° C. The thus formed sample was used as Sample A.

Next, a sample formed by a method which is similar to that of Sample A was subjected to heat treatment at 650° C. As the heat treatment, heat treatment in a nitrogen atmosphere was performed for one hour, and then heat treatment in an oxygen atmosphere was performed for one hour without lowering the temperature. The thus formed sample was used as Sample B.

Figure 14:
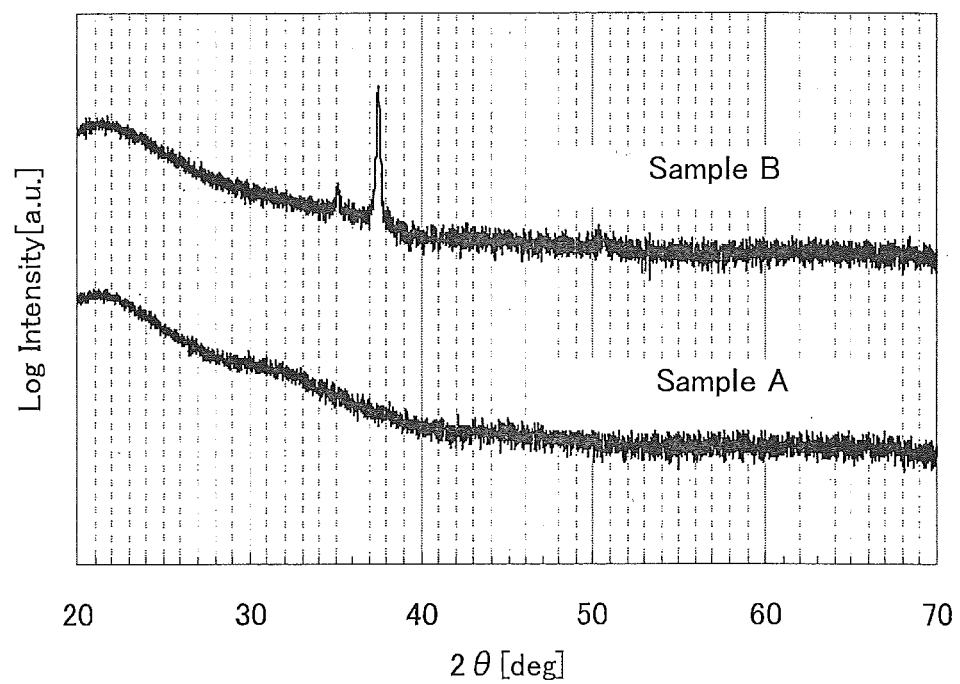
FIG. 14 shows XRD spectra of Sample A and Sample B.

FIG. 14 shows XRD spectra of Sample A and Sample B. No peak derived from crystal was observed in Sample A, whereas peaks derived from crystal were observed when 2θ was around 35 deg. and at 37 to 38 deg. in Sample B.

As described above, by intentionally heating a substrate during deposition of an oxide semiconductor containing In, Sn, and Zn as main components and/or by performing heat treatment after the deposition, characteristics of a transistor can be improved.

These substrate heating and heat treatment prevent hydrogen and a hydroxyl group, which are unfavorable impurities for an oxide semiconductor, from being included in the film or remove hydrogen and a hydroxyl group from the film. In other words, an oxide semiconductor can be highly purified by removal of hydrogen serving as a donor impurity from the oxide semiconductor, so that a normally off transistor can be obtained. High purification of an oxide semiconductor enables the off-state current of the transistor to be 1 aA/μm or lower. Here, the unit of the off-state current represents current per micrometer of channel width.

Figure 15:
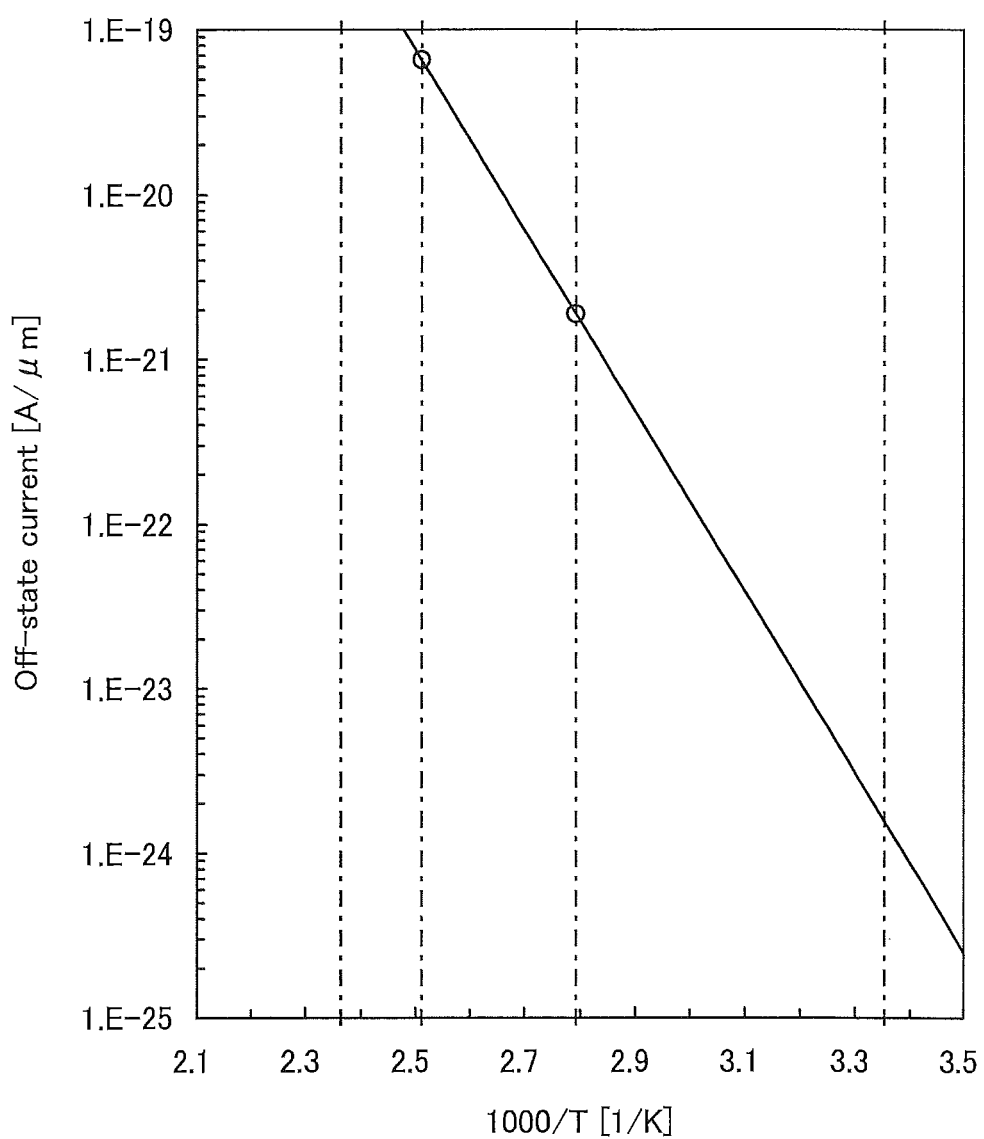
FIG. 15 is a graph showing a relationship between the off-state current of a transistor and substrate temperature in measurement.

FIG. 15 shows a relationship between the off-state current of the transistor and the inverse of the substrate temperature (absolute temperature) during measurement. Here, for simplicity, the horizontal axis represents a value (1000/T) obtained by multiplication of the inverse of substrate temperature during measurement by 1000.

Specifically, as shown in FIG. 15, the off-state current was 0.1 aA/μm ($1\times10^{-19}$ A/μm) or lower and 10 zA/μm ($1\times10^{-20}$ A/μm) or lower when the substrate temperature was 125° C. and 85° C., respectively. The proportional relationship between the logarithm of the off-state current and the inverse of the temperature suggests that the off-state current at room temperature (27° C.) is 0.1 zA/μm ($1\times10^{-22}$ A/μm) or lower. Thus, the off-state current can be 1 aA/μm ($1\times10^{-18}$ A/μm) or lower, 100 zA/μm ($1\times10^{-19}$ A/μm) or lower, and 1 zA/μm ($1\times10^{-21}$ A/μm) or lower at 125° C., 85° C., and room temperature, respectively. The values of off-state currents are clearly much lower than that of a transistor including Si in a semiconductor film.

In order to prevent hydrogen and moisture from being included in the oxide semiconductor film during deposition of the oxide semiconductor film, it is preferable to increase the purity of a sputtering gas by sufficiently inhibiting leakage from the outside of a deposition chamber and degasification through an inner wall of the deposition chamber. For example, a gas with a dew point of −70° C. or lower is preferably used as the sputtering gas in order to prevent moisture from being included in the film. In addition, it is preferable to use a target which is highly purified so as not to include impurities such as hydrogen and moisture. Although it is possible to remove moisture from a film of an oxide semiconductor containing In, Sn, and Zn as main components by heat treatment, a film which does not include moisture originally is preferably formed. This is because temperature at which moisture is released from the oxide semiconductor containing In, Sn, and Zn as main components is higher than temperature at which moisture is released from an oxide semiconductor containing In, Ga, and Zn as main components.

The relationship between the substrate temperature and electrical characteristics of a transistor using Sample B on which heat treatment was performed at 650° C. after formation of the oxide semiconductor film was evaluated.

The transistor used for the measurement has a channel length L of 3 μm, a channel width W of 10 μm, Lov of 0 μm, and dW of 0 μm. Note that $V_d$ was set to 10 V. The substrate temperatures were −40° C., —25° C., 25° C., 75° C., 125° C., and 150° C. Here, in the transistor, the width of a portion where a gate electrode overlaps with a pair of electrodes is referred to as Lov, and the width of a portion of the pair of electrodes that does not overlap with an oxide semiconductor film is referred to as dW.

Figure 16:
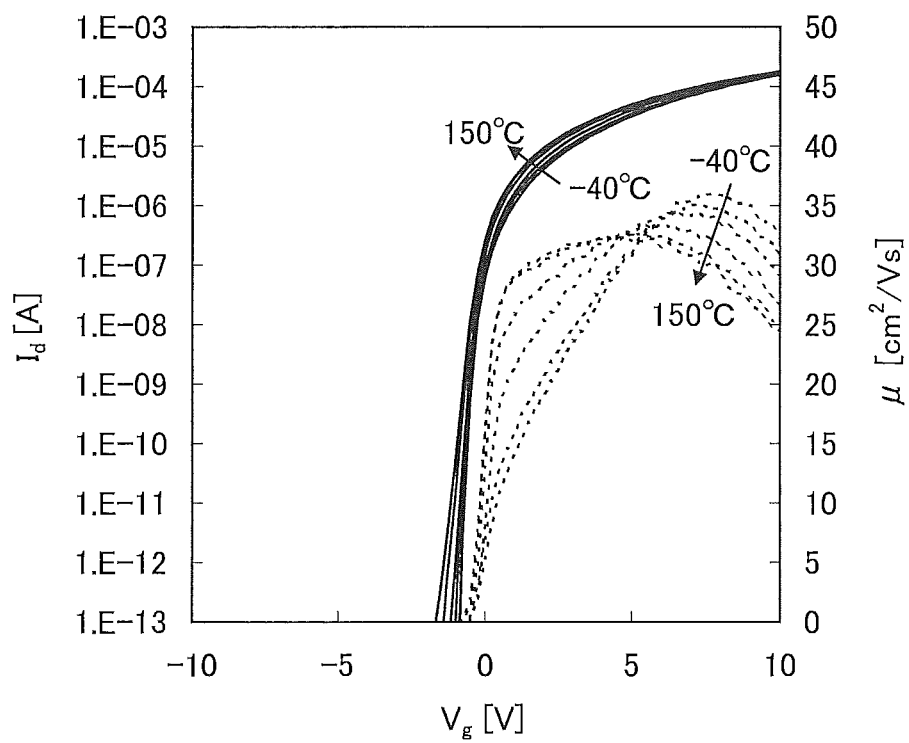
FIG. 16 is a graph showing $V_g$ dependence of $I_d$ and field-effect mobility.
Figure 17A:
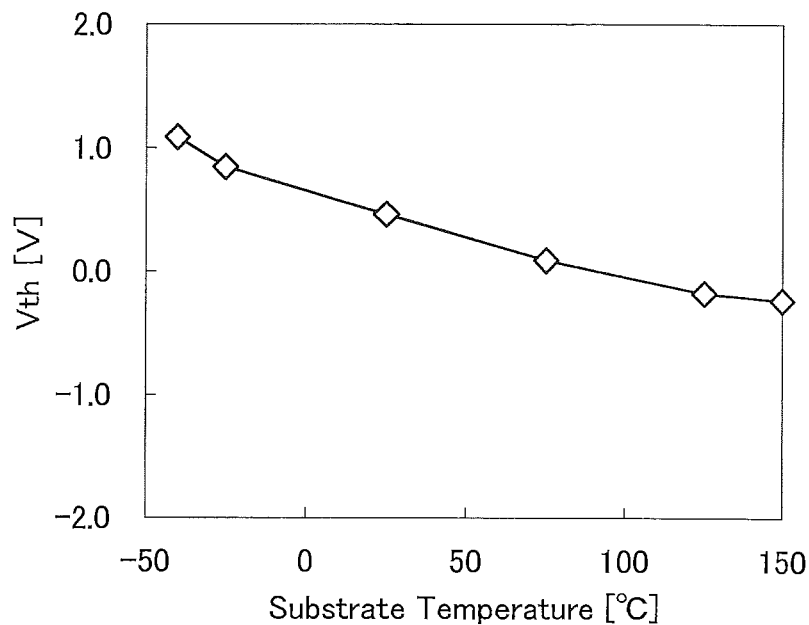
FIG. 17A is a graph showing a relationship between substrate temperature and the threshold voltage.

FIG. 16 shows $V_g$ dependence of $I_d$ (a solid line) and field-effect mobility (a dotted line). FIG. 17A shows a relationship between the substrate temperature and the threshold voltage, and FIG. 17B shows a relationship between the substrate temperature and the field-effect mobility.

FIG. 17A shows that the threshold voltage becomes lower as the substrate temperature becomes higher. Note that the threshold voltage is decreased from 1.09 V to −0.23 V in the range of −40 to 150° C.

Figure 17B:
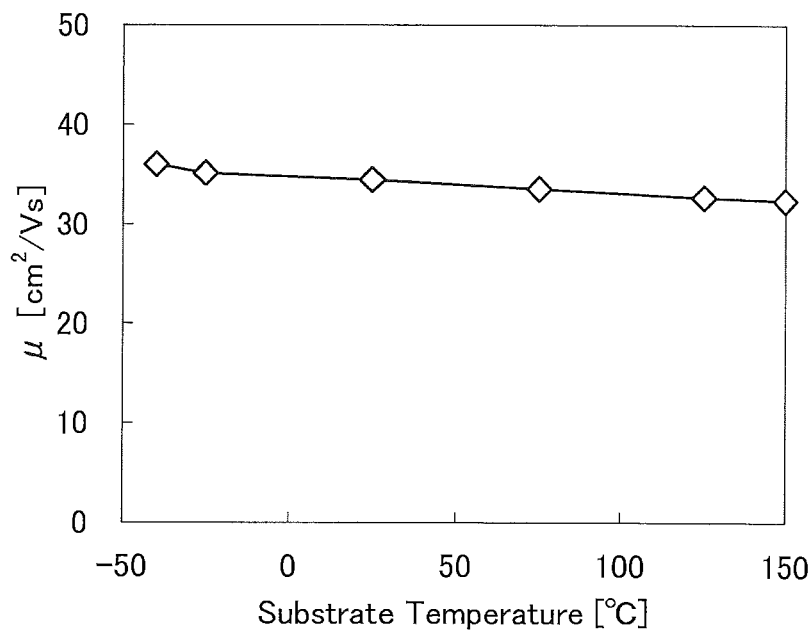
FIG. 17B is a graph showing a relationship between substrate temperature and field-effect mobility.

FIG. 17B shows that the field-effect mobility becomes lower as the substrate temperature becomes higher. Note that the field-effect mobility is decreased from 36 cm$^2$/Vs to 32 cm$^2$/Vs in the range of −40° C. to 150° C. Thus, it is found that changes in electrical characteristics are small in the above temperature range.

In a transistor in which such an oxide semiconductor containing In, Sn, and Zn as main components is used as a channel formation region, a field-effect mobility of 30 cm$^2$/Vs or higher, preferably 40 cm$^2$/Vs or higher, more preferably 60 cm$^2$/V·s or higher can be obtained with the off-state current kept at 1 aA/μm or lower, which can achieve on-state current needed for an LSI. For example, in an FET where L/W is 33 nm/40 nm, an on-state current of 12 μA or higher can flow when gate voltage is 2.7 V and drain voltage is 1.0 V. In addition, sufficient electrical characteristics can be secured in a temperature range needed for operation of a transistor.

This embodiment can be combined with any of the other embodiments as appropriate.

Embodiment 5

A magnetic tunnel junction element (an MTJ element) is generally known as a nonvolatile random access memory. The MTJ element stores data in a low resistance state when the magnetization directions of ferromagnetic films provided above and below with an insulating film provided therebetween are parallel, and stores data in a high resistance state when the magnetization directions are anti-parallel. On the other hand, the nonvolatile storage circuit in the above embodiment utilizes a transistor whose channel is formed in an oxide semiconductor layer. The principles of the MTJ element and the nonvolatile storage circuit in the above embodiment are completely different from each other. Table 1 shows comparison between the MTJ element (indicated by "spintronics (MTJ element)" in the table) and the nonvolatile storage circuit including an oxide semiconductor in the above embodiment (indicated by "OS/Si" in the table).

TABLE 1

|   | Spintronics (MTJ element) | OS/Si |
|---|---|---|
| Heat Resistance | Curie temperature | Process temperature at 500° C. (reliability at 150° C.) |
| Driving Method | Current driving | Voltage driving |
| Writing Principle | Changing magnetization direction of magnetic body | Turning on/off FET |
| Si LSI | Suitable for bipolar LSI (MOS LSI is preferable for high integration because bipolar LSI is unsuitable for high integration. Note that W becomes larger.) | Suitable for MOS LSI |
| Overhead | Large (because of high Joule heat) | Smaller than overhead of the MTJ element by 2 to 3 or more orders of magnitude (because of charging and discharging of parasitic capacitance) |
| Nonvolatility | Utilizing magnetization | Utilizing low off-state current |
| Read Number | Without limitation | Without limitation |
| 3D Conversion | Difficult (at most two layers) | Easy (the number of layers is limitless) |
| Integration Degree (F$^2$) | 4 to 15 F$^2$ | Depends on the number of layers stacked in 3D conversion (it is necessary to ensure heat resistance in process of forming upper OS FET) |
| Material | Magnetic rare-earth element | OS material |
| Cost per Bit | High | Low (might be slightly high depending on OS material) |
| Resistance to Magnetic | Low | High |

The MTJ element is disadvantageous in that magnetic properties are lost when the temperature is the Curie temperature or higher because a magnetic material is used. Further, the MTJ element is compatible with a silicon bipolar device because current driving is employed. However, the bipolar device is unsuitable for high integration. Furthermore, the MTJ element has a problem in that power consumption is increased by an increase in memory capacity, though the MTJ element consumes a minute amount of current during data writing.

In principle, the MTJ element has low resistance to a magnetic field, so that the magnetization direction is likely to change when the MTJ element is exposed to a high magnetic field. Further, it is necessary to control magnetic fluctuation due to nanoscaling of a magnetic body used for the MTJ element.

In addition, a rare earth element is used for the MTJ element; thus, it requires special attention to incorporate a process of forming the MTJ element in a process of forming a silicon semiconductor that avoids metal contamination. Further, the material cost per bit of the MTJ element is expensive.

On the other hand, the transistor whose channel is formed in the oxide semiconductor layer that is included in the nonvolatile storage circuit in the above embodiment has an element structure and an operation principle which are similar to those of a silicon MOSFET except that the region in which the channel is formed includes a metal oxide. Further, the transistor whose channel is formed in the oxide semiconductor layer is not affected by a magnetic field, and does not cause soft errors. This shows that the transistor is highly compatible with a silicon integrated circuit.

Example 1

In this example, an example of a transistor whose channel is formed in an oxide semiconductor layer formed using an In—Sn—Zn—O film is described with reference to FIGS. 18A and 18B.

Figure 18A:
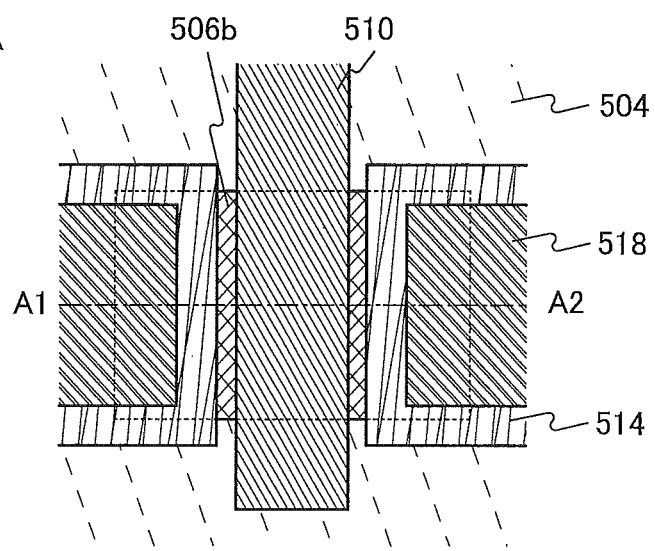
FIGS. 18A and 18B are a top view and a cross-sectional view of a transistor whose channel is formed in an oxide semiconductor layer.
Figure 18B:
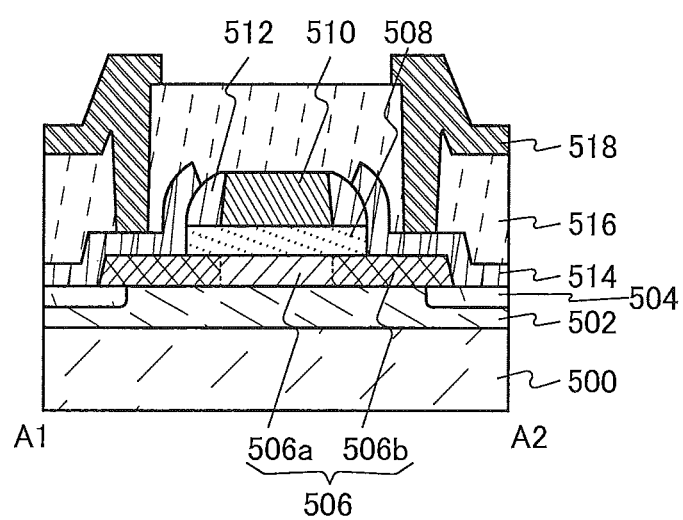

FIGS. 18A and 18B are a top view and a cross-sectional view of a coplanar transistor with a top-gate top-contact structure. FIG. 18A is the top view of the transistor. FIG. 18B is a cross-sectional view taken along dashed-dotted line A1-A2 in FIG. 18A.

The transistor illustrated in FIG. 18B includes a substrate 500; a base insulating film 502 provided over the substrate 500; a protective insulating film 504 provided at the periphery of the base insulating film 502; an oxide semiconductor film 506 which is provided over the base insulating film 502 and the protective insulating film 504 and includes a high-resistance region 506a and low-resistance regions 506b; a gate insulating film 508 provided over the oxide semiconductor film 506; a gate electrode 510 provided to overlap with the oxide semiconductor film 506 with the gate insulating film 508 provided therebetween; a sidewall insulating film 512 provided in contact with a side surface of the gate electrode 510; a pair of electrodes 514 provided in contact with at least the low-resistance regions 506b; an interlayer insulating film 516 provided to cover at least the oxide semiconductor film 506, the gate electrode 510, and the pair of electrodes 514; and a wiring 518 provided to be connected to at least one of the pair of electrodes 514 through an opening formed in the interlayer insulating film 516.

Although not illustrated, a protective film for covering the interlayer insulating film 516 and the wiring 518 may be provided. With the protective film, a minute amount of leakage current generated by surface conduction of the interlayer insulating film 516 can be reduced, so that the off-state current of the transistor can be reduced.

This example can be combined with any of the above embodiments as appropriate.

Example 2

In this example, an example of a transistor that is different from the above transistor and has a channel in an oxide semiconductor layer formed using an In—Sn—Zn—O film is described.

Figure 19A:
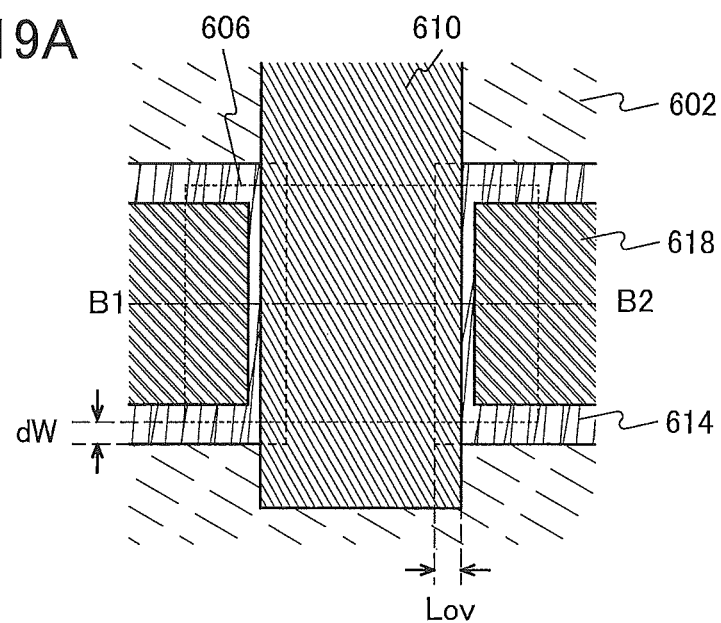
FIGS. 19A and 19B are a top view and a cross-sectional view of a transistor whose channel is formed in an oxide semiconductor layer.
Figure 19B:
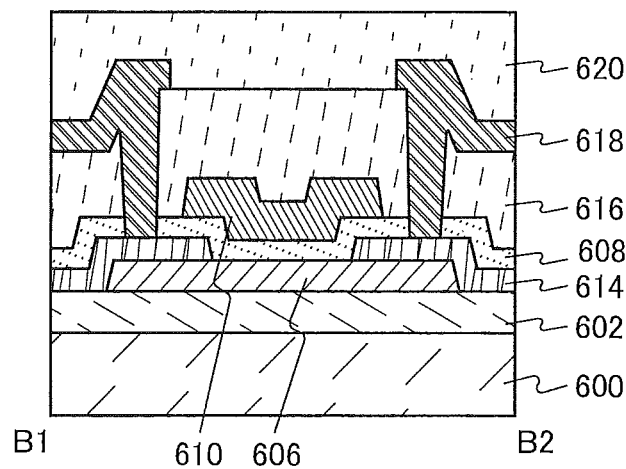

FIGS. 19A and 19B are a top view and a cross-sectional view which illustrate the structure of a transistor formed in this example. FIG. 19A is the top view of the transistor. FIG. 19B is a cross-sectional view taken along dashed-dotted line B1-B2 in FIG. 19A.

The transistor illustrated in FIG. 19B includes a substrate 600; a base insulating film 602 provided over the substrate 600; an oxide semiconductor film 606 provided over the base insulating film 602; a pair of electrodes 614 which is in contact with the oxide semiconductor film 606; a gate insulating film 608 provided over the oxide semiconductor film 606 and the pair of electrodes 614; a gate electrode 610 provided to overlap with the oxide semiconductor film 606 with the gate insulating film 608 provided therebetween; an interlayer insulating film 616 provided to cover the gate insulating film 608 and the gate electrode 610; wirings 618 connected to the pair of electrodes 614 through openings formed in the interlayer insulating film 616; and a protective film 620 provided to cover the interlayer insulating film 616 and the wirings 618.

A glass substrate is used as the substrate 600. A silicon oxide film is used as the base insulating film 602. An In—Sn—Zn—O film is used as the oxide semiconductor film 606. A tungsten film is used as the pair of electrodes 614. A silicon oxide film is used as the gate insulating film 608. The gate electrode 610 has a layered structure of a tantalum nitride film and a tungsten film. The interlayer insulating film 616 has a layered structure of a silicon oxynitride film and a polyimide film. The wirings 618 each have a layered structure in which a titanium film, an aluminum film, and a titanium film are formed in that order. A polyimide film is used as the protective film 620.

Note that in the transistor with the structure illustrated in FIG. 19A, the width of a portion where the gate electrode 610 overlaps with the pair of electrodes 614 is referred to as Lov. Similarly, the width of a portion of the pair of electrodes 614 that does not overlap with the oxide semiconductor film 606 is referred to as dW.

This example can be combined with any of the above embodiments as appropriate.

This application is based on Japanese Patent Application serial No. 2011-127823 filed with Japan Patent Office on Jun. 8, 2011, the entire contents of which are hereby incorporated by reference.

What is claimed is:

1. A communication system comprising:
   a reader/writer; and
   a semiconductor device having a power supply circuit being configured to supply power supply voltage and a signal processing circuit including a storage circuit,
   wherein the storage circuit includes a capacitor and a transistor having a channel comprising an oxide semiconductor,
   wherein one of electrodes of the capacitor is electrically connected to one of a source and a drain of the transistor via a holding node, and
   wherein the storage circuit is configured to store data after a signal potential corresponding to the data is input to the holding node, the transistor is turned off, and the holding node is set in a floating state.

2. The communication system according to claim 1, wherein when supply of the power supply voltage from the power supply circuit to the signal processing circuit is temporarily stopped, the signal processing circuit is configured to revert to a state before the supply of the power supply voltage is stopped and restart signal processing.

3. The communication system according to claim 1, wherein when supply of the power supply voltage from the power supply circuit to the signal processing circuit is temporarily stopped, a ground potential is input to a gate of the transistor.

4. The communication system according to claim 1, wherein the semiconductor device is a passive wireless tag.

5. The communication system according to claim 1, wherein the oxide semiconductor comprises at least one of indium and gallium.

6. A communication system comprising:
a reader/writer configured to transmit a command and receive a response; and
a semiconductor device configured to receive the command and transmit the response, the semiconductor device having a power supply circuit configured to supply power supply voltage and a signal processing circuit,
wherein the signal processing circuit comprises a storage circuit,
wherein the storage circuit includes a capacitor and a transistor having a channel comprising an oxide semiconductor,
wherein one of electrodes of the capacitor is electrically connected to one of a source and a drain of the transistor via a holding node, and
wherein the storage circuit is configured to store data after a signal potential corresponding to the data is input to the holding node, the transistor is turned off, and the holding node is set in a floating state.

7. The communication system according to claim 6, wherein when supply of the power supply voltage from the power supply circuit to the signal processing circuit is temporarily stopped, the signal processing circuit is configured to revert to a state before the supply of the power supply voltage is stopped and restart signal processing.

8. The communication system according to claim 6, wherein when supply of the power supply voltage from the power supply circuit to the signal processing circuit is temporarily stopped, a ground potential is input to a gate of the transistor.

9. The communication system according to claim 6, wherein the semiconductor device is a passive wireless tag.

10. The communication system according to claim 6, wherein the oxide semiconductor comprises at least one of indium and gallium.

11. A communication system comprising:
a reader/writer configured to transmit a command and receive a response; and
a semiconductor device configured to receive the command and transmit the response, the semiconductor device having a power supply circuit configured to supply power supply voltage and a signal processing circuit,
wherein the signal processing circuit comprises a flip-flop and a storage circuit configured to store data retained in the flip-flop,
wherein the storage circuit includes a capacitor and a transistor having a channel comprising an oxide semiconductor,
wherein one of electrodes of the capacitor is electrically connected to one of a source and a drain of the transistor via a holding node, and
wherein the storage circuit is configured to store the data after a signal potential corresponding to the data is input to the holding node, the transistor is turned off, and the holding node is set in a floating state.

12. The communication system according to claim 11, wherein when supply of the power supply voltage from the power supply circuit to the signal processing circuit is temporarily stopped, the signal processing circuit is configured to revert to a state before the supply of the power supply voltage is stopped and restart signal processing.

13. The communication system according to claim 11, wherein when supply of the power supply voltage from the power supply circuit to the signal processing circuit is temporarily stopped, a ground potential is input to a gate of the transistor.

14. The communication system according to claim 11, wherein the semiconductor device is a passive wireless tag.

15. The communication system according to claim 11, wherein the oxide semiconductor comprises at least one of indium and gallium.

16. A semiconductor device comprising:
a power supply circuit configured to supply power supply voltage; and
a signal processing circuit including a storage circuit,
wherein the storage circuit includes a capacitor and a transistor having a channel comprising an oxide semiconductor,
wherein one of electrodes of the capacitor is electrically connected to one of a source and a drain of the transistor via a holding node, and
wherein the storage circuit is configured to store data after a signal potential corresponding to the data is input to the holding node, the transistor is turned off, and the holding node is set in a floating state.

17. The semiconductor device according to claim 16, wherein when supply of the power supply voltage from the power supply circuit to the signal processing circuit is temporarily stopped, the signal processing circuit is configured to revert to a state before the supply of the power supply voltage is stopped and restart signal processing.

18. The semiconductor device according to claim 16, wherein when the supply of power supply voltage from the power supply circuit to the signal processing circuit is temporarily stopped, a ground potential is input to a gate of the transistor.

19. The semiconductor device according to claim 16, wherein the semiconductor device is a passive wireless tag.

20. The semiconductor device according to claim 16, wherein the oxide semiconductor comprises at least one of indium and gallium.

21. A semiconductor device comprising:
a power supply circuit configured to supply power supply voltage; and
a signal processing circuit,
wherein the semiconductor device is configured to receive a command and transmit a response,
wherein the signal processing circuit comprises a storage circuit,
wherein the storage circuit includes a capacitor and a transistor having a channel comprising an oxide semiconductor,
wherein one of electrodes of the capacitor is electrically connected to one of a source and a drain of the transistor via a holding node, and
wherein the storage circuit is configured to store data after a signal potential corresponding to the data is input to the holding node, the transistor is turned off, and the holding node is set in a floating state.

22. The semiconductor device according to claim 21, wherein when supply of the power supply voltage from the power supply circuit to the signal processing circuit is temporarily stopped, the signal processing circuit is configured to revert to a state before the supply of the power supply voltage is stopped and restart signal processing.

23. The semiconductor device according to claim 21, wherein when supply of the power supply voltage from the power supply circuit to the signal processing circuit is temporarily stopped, a ground potential is input to a gate of the transistor.

24. The semiconductor device according to claim 21, wherein the semiconductor device is a passive wireless tag.

25. The semiconductor device according to claim 21, wherein the oxide semiconductor comprises at least one of indium and gallium.

26. A semiconductor device comprising:
   a power supply circuit configured to supply power supply voltage; and
   a signal processing circuit,
   wherein the semiconductor device is configured to receive a command and transmit a response,
   wherein the signal processing circuit comprises a flip-flop and a storage circuit configured to store data retained in the flip-flop,
   wherein the storage circuit includes a capacitor and a transistor having a channel comprising an oxide semiconductor,
   wherein one of electrodes of the capacitor is electrically connected to one of a source and a drain of the transistor via a holding node, and
   wherein the storage circuit is configured to store the data after a signal potential corresponding to the data is input to the holding node, the transistor is turned off, and the holding node is set in a floating state.

27. The semiconductor device according to claim 26, wherein when supply of the power supply voltage from the power supply circuit to the signal processing circuit is temporarily stopped, the signal processing circuit is configured to revert to a state before the supply of the power supply voltage is stopped and restart signal processing.

28. The semiconductor device according to claim 26, wherein when supply of the power supply voltage from the power supply circuit to the signal processing circuit is temporarily stopped, a ground potential is input to a gate of the transistor.

29. The semiconductor device according to claim 26, wherein the semiconductor device is a passive wireless tag.

30. The semiconductor device according to claim 26, wherein the oxide semiconductor comprises at least one of indium and gallium.

* * * * *